United States Patent
Xiang et al.

(10) Patent No.: US 12,395,588 B2
(45) Date of Patent: Aug. 19, 2025

(54) METHOD AND APPARATUS FOR CREATING A DATABASE OF CONTACT CENTER RESPONSE RECORDS

(71) Applicant: Talkdesk, Inc., San Francisco, CA (US)

(72) Inventors: Jiali Xiang, Wuhan (CN); Marta Sofia da Silva Pereira, Oporto (PT); João Ribeiro Marques, Lisbon (PT); Vitor Alves Cardoso, Coimbra (PT); Dina Raquel Dias Barbosa, Lisbon (PT); Haili Zhen, Wuhan (CN); Isa Maria da Silva Costa, Lisbon (PT); Alex Harvey Wake, Shrewsbury (GB)

(73) Assignee: Talkdesk, Inc., San Francisco, CA (US)

( * ) Notice: Subject to any disclaimer, the term of this patent is extended or adjusted under 35 U.S.C. 154(b) by 60 days.

(21) Appl. No.: 18/238,926

(22) Filed: Aug. 28, 2023

(65) Prior Publication Data
US 2025/0080653 A1    Mar. 6, 2025

(51) Int. Cl.
*H04M 3/51*    (2006.01)
*H04M 3/523*    (2006.01)

(52) U.S. Cl.
CPC .... *H04M 3/5175* (2013.01); *H04M 2203/558* (2013.01)

(58) Field of Classification Search
None
See application file for complete search history.

(56) References Cited

U.S. PATENT DOCUMENTS

| | | |
|---|---|---|
| 5,343,518 A | 8/1994 | Kneipp |
| 5,570,419 A | 10/1996 | Cave et al. |
| 5,862,203 A | 1/1999 | Wulkan et al. |
| 5,897,616 A | 4/1999 | Kanevsky et al. |
| 5,966,691 A | 10/1999 | Kibre et al. |
| 5,970,124 A | 10/1999 | Csaszar et al. |
| 6,100,891 A | 8/2000 | Thorne |

(Continued)

FOREIGN PATENT DOCUMENTS

| | | |
|---|---|---|
| EP | 1 418 519 A1 | 5/2004 |
| JP | 5986065 B2 | 9/2016 |

(Continued)

OTHER PUBLICATIONS

Galetto, Molly., "What is Customer DNA?",—NGDATA Product News, Oct. 27, 2015, 10 pages.

(Continued)

*Primary Examiner* — Harry S Hong
(74) *Attorney, Agent, or Firm* — Potomac Law Group, PLLC; Marc S. Kaufman

(57) ABSTRACT

Methods and systems for creating and using a knowledge base in a contact center. Templates, including responses to specific issues, are made available to agents in dynamic manner to allow agents to be more efficient while performing their daily job. A centralized database of templates is created in a novel manner to be used for multiple digital channels. The templates can be used and reused by multiple systems such as an agent assistant system or a virtual agent system, providing an integrated and consistent experience for responding to communications in a contact center.

10 Claims, 9 Drawing Sheets

(56) References Cited

U.S. PATENT DOCUMENTS

| | | |
|---|---|---|
| 6,128,415 A | 10/2000 | Hultgren et al. |
| 6,163,607 A | 12/2000 | Bogart et al. |
| 6,230,197 B1 | 5/2001 | Beck et al. |
| 6,263,057 B1 | 7/2001 | Silverman |
| 6,263,065 B1 | 7/2001 | Durinovic-Johri et al. |
| 6,345,093 B1 | 2/2002 | Lee et al. |
| 6,373,938 B1 | 4/2002 | Palacios et al. |
| 6,377,944 B1 | 4/2002 | Busey et al. |
| 6,385,584 B1 | 5/2002 | Mcalister et al. |
| 6,411,687 B1 | 6/2002 | Bohacek et al. |
| 6,493,695 B1 | 12/2002 | Pickering et al. |
| 6,560,222 B1 | 5/2003 | Pounds et al. |
| 6,587,831 B1 | 7/2003 | O'Brien |
| 6,639,982 B1 | 10/2003 | Stuart et al. |
| 6,721,416 B1 | 4/2004 | Farrell |
| 6,754,333 B1 | 6/2004 | Flockhart et al. |
| 6,859,776 B1 | 2/2005 | Cohen et al. |
| 6,970,829 B1 | 11/2005 | Leamon |
| 7,023,979 B1 | 4/2006 | Wu et al. |
| 7,076,047 B1 | 7/2006 | Brennan et al. |
| 7,110,525 B1 | 9/2006 | Heller et al. |
| 7,209,475 B1 | 4/2007 | Shaffer et al. |
| 7,274,787 B1 | 9/2007 | Schoeneberger |
| 7,292,689 B2 | 11/2007 | Odinak et al. |
| 7,343,406 B1 | 3/2008 | Buonanno et al. |
| 7,372,952 B1 | 5/2008 | Wu et al. |
| 7,382,773 B2 | 6/2008 | Schoeneberger et al. |
| 7,409,336 B2 | 8/2008 | Pak et al. |
| 7,426,268 B2 | 9/2008 | Walker et al. |
| 7,466,334 B1 | 12/2008 | Baba |
| 7,478,051 B2 | 1/2009 | Nourbakhsh et al. |
| 7,537,154 B2 | 5/2009 | Ramachandran |
| 7,634,422 B1 | 12/2009 | Andre et al. |
| 7,657,263 B1 | 2/2010 | Chahrouri |
| 7,664,641 B1 | 2/2010 | Pettay et al. |
| 7,672,746 B1 | 3/2010 | Hamilton et al. |
| 7,672,845 B2 | 3/2010 | Beranek et al. |
| 7,676,034 B1 | 3/2010 | Wu et al. |
| 7,698,163 B2 | 4/2010 | Reed et al. |
| 7,752,159 B2 | 7/2010 | Nelken et al. |
| 7,774,790 B1 | 8/2010 | Jirman et al. |
| 7,788,286 B2 | 8/2010 | Nourbakhsh et al. |
| 7,853,006 B1 | 12/2010 | Fama et al. |
| 7,864,946 B1 | 1/2011 | Fama et al. |
| 7,869,998 B1 | 1/2011 | Di Fabbrizio et al. |
| 7,949,123 B1 | 5/2011 | Flockhart et al. |
| 7,953,219 B2 | 5/2011 | Freedman et al. |
| 7,966,187 B1 | 6/2011 | Pettay et al. |
| 7,966,369 B1 | 6/2011 | Briere et al. |
| 8,060,394 B2 | 11/2011 | Woodings et al. |
| 8,073,129 B1 | 12/2011 | Kalavar |
| 8,116,446 B1 | 2/2012 | Kalavar |
| 8,135,125 B2 | 3/2012 | Sidhu et al. |
| 8,160,233 B2 | 4/2012 | Keren et al. |
| 8,184,782 B1 | 5/2012 | Vatland et al. |
| 8,223,951 B1 | 7/2012 | Edelhaus et al. |
| 8,229,761 B2 | 7/2012 | Backhaus et al. |
| 8,243,896 B1 | 8/2012 | Rae |
| 8,300,798 B1 | 10/2012 | Wu et al. |
| 8,335,704 B2 | 12/2012 | Trefler et al. |
| 8,369,338 B1 | 2/2013 | Peng et al. |
| 8,370,155 B2 | 2/2013 | Byrd et al. |
| 8,391,466 B1 | 3/2013 | Noble, Jr. |
| 8,447,279 B1 | 5/2013 | Peng et al. |
| 8,488,769 B1 | 7/2013 | Noble et al. |
| 8,526,576 B1 | 9/2013 | Deich et al. |
| 8,535,059 B1 | 9/2013 | Noble, Jr. et al. |
| 8,583,466 B2 | 11/2013 | Margulies et al. |
| 8,594,306 B2 | 11/2013 | Laredo et al. |
| 8,626,137 B1 | 1/2014 | Devitt et al. |
| 8,635,226 B2 | 1/2014 | Chang et al. |
| 8,644,489 B1 | 2/2014 | Noble et al. |
| 8,671,020 B1 | 3/2014 | Morrison et al. |
| 8,688,557 B2 | 4/2014 | Rose et al. |
| 8,738,739 B2 | 5/2014 | Makar et al. |
| 8,767,948 B1 | 7/2014 | Riahi et al. |
| 8,811,597 B1 | 8/2014 | Hackbarth et al. |
| 8,861,691 B1 | 10/2014 | De et al. |
| 8,869,245 B2 | 10/2014 | Ranganathan et al. |
| 8,898,219 B2 | 11/2014 | Ricci |
| 8,898,290 B2 | 11/2014 | Siemsgluess |
| 8,909,693 B2 | 12/2014 | Frissora et al. |
| 8,935,172 B1 | 1/2015 | Noble, Jr. et al. |
| 8,995,648 B1 | 3/2015 | Gibbs et al. |
| 8,996,509 B1 | 3/2015 | Sundaram |
| 9,020,142 B2 | 4/2015 | Kosiba et al. |
| 9,026,431 B1 | 5/2015 | Moreno Mengibar et al. |
| 9,060,057 B1 | 6/2015 | Danis |
| 9,065,915 B1 | 6/2015 | Lillard et al. |
| 9,082,094 B1 | 7/2015 | Etter et al. |
| 9,100,483 B1 | 8/2015 | Snedden |
| 9,117,450 B2 | 8/2015 | Cook et al. |
| 9,123,009 B1 | 9/2015 | Etter et al. |
| 9,137,366 B2 | 9/2015 | Medina et al. |
| 9,152,737 B1 | 10/2015 | Micali et al. |
| 9,160,853 B1 | 10/2015 | Daddi et al. |
| 9,178,999 B1 | 11/2015 | Hegde et al. |
| 9,185,222 B1 | 11/2015 | Govindarajan et al. |
| 9,237,232 B1 | 1/2016 | Williams et al. |
| 9,280,754 B1 | 3/2016 | Schwartz et al. |
| 9,286,413 B1 | 3/2016 | Coates et al. |
| 9,300,801 B1 | 3/2016 | Warford et al. |
| 9,317,825 B2 | 4/2016 | Defusco et al. |
| 9,319,524 B1 | 4/2016 | Webster |
| 9,386,152 B2 | 7/2016 | Riahi et al. |
| 9,397,985 B1 | 7/2016 | Seger et al. |
| 9,426,291 B1 | 8/2016 | Ouimette et al. |
| 9,473,637 B1 | 10/2016 | Venkatapathy et al. |
| 9,514,463 B2 | 12/2016 | Grigg et al. |
| 9,595,049 B2 | 3/2017 | Showers et al. |
| 9,602,665 B1 | 3/2017 | Koster |
| 9,609,131 B2 | 3/2017 | Placiakis et al. |
| 9,674,361 B2 | 6/2017 | Ristock et al. |
| 9,679,265 B1 | 6/2017 | Schwartz et al. |
| 9,774,731 B1 | 9/2017 | Haltom et al. |
| 9,787,840 B1 | 10/2017 | Neuer, III et al. |
| 9,813,495 B1 | 11/2017 | Van et al. |
| 9,813,559 B1 | 11/2017 | Noble et al. |
| 9,823,949 B2 | 11/2017 | Ristock et al. |
| 9,883,037 B1 | 1/2018 | Lewis et al. |
| 9,894,478 B1 | 2/2018 | Deluca et al. |
| 9,930,181 B1 | 3/2018 | Moran et al. |
| 9,936,066 B1 * | 4/2018 | Mammen ............ H04M 3/2218 |
| 9,955,021 B1 | 4/2018 | Liu et al. |
| RE46,852 E | 5/2018 | Petrovykh |
| 9,998,596 B1 | 6/2018 | Dunmire et al. |
| 10,009,465 B1 | 6/2018 | Fang et al. |
| 10,038,788 B1 | 7/2018 | Khalatian |
| 10,044,862 B1 | 8/2018 | Cai et al. |
| 10,079,939 B1 | 9/2018 | Bostick et al. |
| 10,085,073 B2 | 9/2018 | Ray et al. |
| 10,101,974 B2 | 10/2018 | Ristock et al. |
| 10,115,065 B1 | 10/2018 | Fama et al. |
| 10,135,973 B2 | 11/2018 | Algard et al. |
| 10,154,138 B2 | 12/2018 | Te Booij et al. |
| 10,194,027 B1 | 1/2019 | Daddi et al. |
| 10,235,999 B1 | 3/2019 | Naughton et al. |
| 10,241,752 B2 | 3/2019 | Lemay et al. |
| 10,242,019 B1 | 3/2019 | Shan et al. |
| 10,276,170 B2 | 4/2019 | Gruber et al. |
| 10,277,745 B1 | 4/2019 | Araujo et al. |
| 10,290,017 B2 | 5/2019 | Traasdahl et al. |
| 10,331,402 B1 | 6/2019 | Spector et al. |
| 10,354,677 B2 | 7/2019 | Mohamed et al. |
| 10,380,246 B2 | 8/2019 | Clark et al. |
| 10,440,180 B1 | 10/2019 | Jayapalan et al. |
| 10,445,742 B2 | 10/2019 | Prendki et al. |
| 10,460,728 B2 | 10/2019 | Anbazhagan et al. |
| 10,497,361 B1 | 12/2019 | Rule et al. |
| 10,554,590 B2 | 2/2020 | Cabrera-Cordon et al. |
| 10,554,817 B1 | 2/2020 | Sullivan et al. |
| 10,572,879 B1 | 2/2020 | Hunter et al. |
| 10,574,822 B1 | 2/2020 | Sheshaiahgari et al. |
| 10,601,992 B2 | 3/2020 | Dwyer et al. |

(56) References Cited

U.S. PATENT DOCUMENTS

| | | |
|---|---|---|
| 10,623,572 B1 | 4/2020 | Copeland |
| 10,635,973 B1 | 4/2020 | Dirac et al. |
| 10,636,425 B2 | 4/2020 | Naughton et al. |
| 10,699,303 B2 | 6/2020 | Ismail et al. |
| 10,715,648 B1 | 7/2020 | Vashisht et al. |
| 10,718,031 B1 | 7/2020 | Wu et al. |
| 10,728,384 B1 | 7/2020 | Channakeshava et al. |
| 10,735,586 B1 | 8/2020 | Johnston |
| 10,742,806 B2 | 8/2020 | Kotak |
| 10,750,019 B1 | 8/2020 | Petrovykh et al. |
| 10,783,568 B1 | 9/2020 | Chandra et al. |
| 10,789,956 B1 | 9/2020 | Dube |
| 10,803,865 B2 | 10/2020 | Naughton et al. |
| 10,812,654 B2 | 10/2020 | Wozniak |
| 10,812,655 B1 | 10/2020 | Adibi et al. |
| 10,827,069 B1 | 11/2020 | Paiva |
| 10,827,071 B1 | 11/2020 | Adibi et al. |
| 10,839,432 B1 | 11/2020 | Konig et al. |
| 10,841,425 B1 | 11/2020 | Langley et al. |
| 10,855,844 B1 | 12/2020 | Smith et al. |
| 10,861,031 B2 | 12/2020 | Sullivan et al. |
| 10,878,479 B2 | 12/2020 | Wu et al. |
| 10,923,127 B2 | 2/2021 | Mckenzie et al. |
| 10,929,796 B1 | 2/2021 | Stepanov |
| 10,943,589 B2 | 3/2021 | Naughton et al. |
| 10,970,682 B1 | 4/2021 | Aykin |
| 11,017,176 B2 | 5/2021 | Ayers et al. |
| 11,089,158 B1 | 8/2021 | Holland et al. |
| 11,272,054 B1 | 3/2022 | Gerrard et al. |
| 11,417,343 B2 | 8/2022 | Cohen et al. |
| 11,425,252 B1 | 8/2022 | Martin et al. |
| 2001/0008999 A1 | 7/2001 | Bull |
| 2001/0024497 A1 | 9/2001 | Campbell |
| 2001/0054072 A1 | 12/2001 | Discolo et al. |
| 2002/0019737 A1 | 2/2002 | Stuart et al. |
| 2002/0029272 A1 | 3/2002 | Weller |
| 2002/0034304 A1 | 3/2002 | Yang |
| 2002/0038420 A1 | 3/2002 | Collins et al. |
| 2002/0067823 A1 | 6/2002 | Walker et al. |
| 2002/0143599 A1 | 10/2002 | Nourbakhsh et al. |
| 2002/0169664 A1 | 11/2002 | Walker et al. |
| 2002/0174182 A1 | 11/2002 | Wilkinson et al. |
| 2002/0181689 A1 | 12/2002 | Rupe et al. |
| 2003/0007621 A1 | 1/2003 | Graves et al. |
| 2003/0009520 A1 | 1/2003 | Nourbakhsh et al. |
| 2003/0032409 A1 | 2/2003 | Hutcheson et al. |
| 2003/0061068 A1 | 3/2003 | Curtis |
| 2003/0112927 A1 | 6/2003 | Brown et al. |
| 2003/0126136 A1 | 7/2003 | Omoigui |
| 2003/0154072 A1 | 8/2003 | Young et al. |
| 2003/0167167 A1 | 9/2003 | Gong |
| 2004/0044585 A1 | 3/2004 | Franco |
| 2004/0044664 A1 | 3/2004 | Cash et al. |
| 2004/0062364 A1 | 4/2004 | Dezonno et al. |
| 2004/0078257 A1 | 4/2004 | Schweitzer et al. |
| 2004/0098274 A1 | 5/2004 | Dezonno et al. |
| 2004/0103051 A1 | 5/2004 | Reed et al. |
| 2004/0141508 A1 | 7/2004 | Schoeneberger et al. |
| 2004/0162724 A1 | 8/2004 | Hill et al. |
| 2004/0162753 A1 | 8/2004 | Vogel et al. |
| 2004/0174980 A1 | 9/2004 | Knott et al. |
| 2004/0215451 A1 | 10/2004 | Macleod |
| 2004/0249650 A1* | 12/2004 | Freedman ......... G06Q 30/0201 |
| | | 705/7.29 |
| 2005/0033957 A1 | 2/2005 | Enokida |
| 2005/0043986 A1 | 2/2005 | Mcconnell et al. |
| 2005/0063365 A1 | 3/2005 | Mathew et al. |
| 2005/0065837 A1 | 3/2005 | Kosiba et al. |
| 2005/0071178 A1 | 3/2005 | Beckstrom et al. |
| 2005/0105712 A1 | 5/2005 | Williams et al. |
| 2005/0177368 A1 | 8/2005 | Odinak et al. |
| 2005/0226220 A1 | 10/2005 | Kilkki et al. |
| 2005/0228774 A1 | 10/2005 | Ronnewinkel |
| 2005/0246511 A1 | 11/2005 | Willman et al. |
| 2005/0271198 A1 | 12/2005 | Chin et al. |
| 2006/0095575 A1 | 5/2006 | Sureka et al. |
| 2006/0126818 A1 | 6/2006 | Berger et al. |
| 2006/0153357 A1 | 7/2006 | Acharya et al. |
| 2006/0166669 A1 | 7/2006 | Claussen |
| 2006/0173724 A1 | 8/2006 | Trefler et al. |
| 2006/0188086 A1 | 8/2006 | Busey et al. |
| 2006/0203994 A1 | 9/2006 | Shaffer et al. |
| 2006/0209797 A1 | 9/2006 | Anisimov et al. |
| 2006/0215831 A1 | 9/2006 | Knott et al. |
| 2006/0229931 A1 | 10/2006 | Fligler et al. |
| 2006/0256953 A1 | 11/2006 | Pulaski et al. |
| 2006/0271361 A1 | 11/2006 | Vora et al. |
| 2006/0274856 A1 | 12/2006 | Dun et al. |
| 2006/0277108 A1 | 12/2006 | Altberg et al. |
| 2007/0011153 A1 | 1/2007 | Pillai et al. |
| 2007/0016565 A1 | 1/2007 | Evans et al. |
| 2007/0036334 A1 | 2/2007 | Culbertson et al. |
| 2007/0038499 A1 | 2/2007 | Margulies et al. |
| 2007/0041519 A1 | 2/2007 | Erhart et al. |
| 2007/0061183 A1 | 3/2007 | Seetharaman et al. |
| 2007/0078725 A1 | 4/2007 | Koszewski et al. |
| 2007/0121894 A1 | 5/2007 | Noble |
| 2007/0121902 A1 | 5/2007 | Stoica et al. |
| 2007/0121903 A1 | 5/2007 | Moore et al. |
| 2007/0133760 A1 | 6/2007 | Cotignola et al. |
| 2007/0136284 A1 | 6/2007 | Cobb et al. |
| 2007/0155411 A1 | 7/2007 | Morrison |
| 2007/0157021 A1 | 7/2007 | Whitfield |
| 2007/0160188 A1 | 7/2007 | Sharpe et al. |
| 2007/0162296 A1 | 7/2007 | Altberg et al. |
| 2007/0198329 A1 | 8/2007 | Lyerly et al. |
| 2007/0201636 A1 | 8/2007 | Gilbert et al. |
| 2007/0211881 A1 | 9/2007 | Parker-Stephen |
| 2007/0263810 A1 | 11/2007 | Sterns |
| 2007/0265990 A1 | 11/2007 | Sidhu et al. |
| 2007/0269031 A1 | 11/2007 | Honig et al. |
| 2007/0280460 A1 | 12/2007 | Harris et al. |
| 2007/0287430 A1 | 12/2007 | Hosain et al. |
| 2008/0002823 A1 | 1/2008 | Fama et al. |
| 2008/0004933 A1 | 1/2008 | Gillespie |
| 2008/0043976 A1 | 2/2008 | Maximo et al. |
| 2008/0065902 A1 | 3/2008 | Spohrer et al. |
| 2008/0095355 A1 | 4/2008 | Mahalaha et al. |
| 2008/0115213 A1 | 5/2008 | Bhatt et al. |
| 2008/0126957 A1 | 5/2008 | Tysowski et al. |
| 2008/0205620 A1 | 8/2008 | Odinak et al. |
| 2008/0225872 A1 | 9/2008 | Collins et al. |
| 2008/0254774 A1 | 10/2008 | Lee |
| 2008/0255944 A1 | 10/2008 | Shah et al. |
| 2008/0260138 A1 | 10/2008 | Chen et al. |
| 2008/0288770 A1 | 11/2008 | Kline et al. |
| 2008/0300955 A1 | 12/2008 | Hamilton et al. |
| 2009/0018996 A1 | 1/2009 | Hunt et al. |
| 2009/0055920 A1 | 2/2009 | Murtagh et al. |
| 2009/0080411 A1 | 3/2009 | Lyman |
| 2009/0086945 A1 | 4/2009 | Buchanan et al. |
| 2009/0086949 A1 | 4/2009 | Caspi et al. |
| 2009/0086953 A1 | 4/2009 | Vendrow |
| 2009/0110182 A1 | 4/2009 | Knight, Jr. et al. |
| 2009/0171164 A1 | 7/2009 | Jung et al. |
| 2009/0222551 A1 | 9/2009 | Neely et al. |
| 2009/0228264 A1 | 9/2009 | Williams et al. |
| 2009/0234710 A1 | 9/2009 | Belgaied et al. |
| 2009/0234732 A1 | 9/2009 | Zorman et al. |
| 2009/0245479 A1 | 10/2009 | Surendran |
| 2009/0285384 A1 | 11/2009 | Pollock et al. |
| 2009/0306981 A1 | 12/2009 | Cromack et al. |
| 2009/0307052 A1 | 12/2009 | Mankani et al. |
| 2010/0106568 A1 | 4/2010 | Grimes |
| 2010/0114645 A1 | 5/2010 | Hamilton et al. |
| 2010/0114646 A1 | 5/2010 | Mcilwain et al. |
| 2010/0165977 A1 | 7/2010 | Mccord |
| 2010/0189249 A1 | 7/2010 | Shah et al. |
| 2010/0189250 A1 | 7/2010 | Williams et al. |
| 2010/0211515 A1 | 8/2010 | Woodings et al. |
| 2010/0226490 A1 | 9/2010 | Schultz et al. |
| 2010/0235341 A1 | 9/2010 | Bennett |
| 2010/0250196 A1 | 9/2010 | Lawler et al. |
| 2010/0262549 A1 | 10/2010 | Kannan et al. |

(56) References Cited

U.S. PATENT DOCUMENTS

| | | |
|---|---|---|
| 2010/0266115 A1 | 10/2010 | Fedorov et al. |
| 2010/0266116 A1 | 10/2010 | Stolyar et al. |
| 2010/0274618 A1 | 10/2010 | Byrd et al. |
| 2010/0287131 A1 | 11/2010 | Church |
| 2010/0293033 A1 | 11/2010 | Hall et al. |
| 2010/0299268 A1 | 11/2010 | Guha et al. |
| 2010/0332287 A1 | 12/2010 | Gates et al. |
| 2011/0014932 A1 | 1/2011 | Estevez |
| 2011/0022461 A1 | 1/2011 | Simeonov |
| 2011/0071870 A1 | 3/2011 | Gong |
| 2011/0077994 A1 | 3/2011 | Segev et al. |
| 2011/0082688 A1 | 4/2011 | Kim et al. |
| 2011/0116618 A1 | 5/2011 | Zyarko et al. |
| 2011/0125697 A1 | 5/2011 | Erhart et al. |
| 2011/0143323 A1 | 6/2011 | Cohen |
| 2011/0182283 A1 | 7/2011 | Van et al. |
| 2011/0185293 A1 | 7/2011 | Barnett et al. |
| 2011/0194684 A1 | 8/2011 | Ristock et al. |
| 2011/0216897 A1 | 9/2011 | Laredo et al. |
| 2011/0264581 A1 | 10/2011 | Clyne |
| 2011/0267985 A1 | 11/2011 | Wilkinson et al. |
| 2011/0286592 A1 | 11/2011 | Nimmagadda |
| 2011/0288897 A1 | 11/2011 | Erhart et al. |
| 2012/0046996 A1 | 2/2012 | Shah et al. |
| 2012/0051537 A1 | 3/2012 | Chishti et al. |
| 2012/0084217 A1 | 4/2012 | Kohler et al. |
| 2012/0087486 A1 | 4/2012 | Guerrero et al. |
| 2012/0095835 A1 | 4/2012 | Makar et al. |
| 2012/0109830 A1 | 5/2012 | Vogel |
| 2012/0257116 A1 | 10/2012 | Hendrickson et al. |
| 2012/0265587 A1 | 10/2012 | Kinkead |
| 2012/0290373 A1 | 11/2012 | Ferzacca et al. |
| 2012/0300920 A1 | 11/2012 | Fagundes et al. |
| 2012/0321073 A1 | 12/2012 | Flockhart et al. |
| 2013/0023235 A1 | 1/2013 | Fan et al. |
| 2013/0060587 A1 | 3/2013 | Bayrak et al. |
| 2013/0073361 A1 | 3/2013 | Silver |
| 2013/0085785 A1 | 4/2013 | Rogers et al. |
| 2013/0090963 A1 | 4/2013 | Sharma et al. |
| 2013/0124361 A1 | 5/2013 | Bryson |
| 2013/0136252 A1 | 5/2013 | Kosiba et al. |
| 2013/0223608 A1 | 8/2013 | Flockhart et al. |
| 2013/0223610 A1 | 8/2013 | Kohler et al. |
| 2013/0236002 A1 | 9/2013 | Jennings et al. |
| 2013/0257877 A1 | 10/2013 | Davis |
| 2013/0304581 A1 | 11/2013 | Soroca et al. |
| 2013/0325972 A1 | 12/2013 | Boston et al. |
| 2014/0012603 A1 | 1/2014 | Scanlon et al. |
| 2014/0016762 A1 | 1/2014 | Mitchell et al. |
| 2014/0039944 A1 | 2/2014 | Humbert et al. |
| 2014/0039962 A1 | 2/2014 | Nudd et al. |
| 2014/0067375 A1 | 3/2014 | Wooters |
| 2014/0079195 A1 | 3/2014 | Srivastava et al. |
| 2014/0079207 A1 | 3/2014 | Zhakov et al. |
| 2014/0099916 A1 | 4/2014 | Mallikarjunan et al. |
| 2014/0101261 A1 | 4/2014 | Wu et al. |
| 2014/0136346 A1 | 5/2014 | Teso |
| 2014/0140494 A1 | 5/2014 | Zhakov |
| 2014/0143018 A1 | 5/2014 | Nies et al. |
| 2014/0143249 A1 | 5/2014 | Cazzanti et al. |
| 2014/0161241 A1 | 6/2014 | Baranovsky et al. |
| 2014/0164502 A1 | 6/2014 | Khodorenko et al. |
| 2014/0177819 A1 | 6/2014 | Vymenets et al. |
| 2014/0188477 A1 | 7/2014 | Zhang |
| 2014/0200988 A1 | 7/2014 | Kassko et al. |
| 2014/0219132 A1 | 8/2014 | Delveaux et al. |
| 2014/0219438 A1 | 8/2014 | Brown et al. |
| 2014/0233719 A1 | 8/2014 | Vyemenets et al. |
| 2014/0244712 A1 | 8/2014 | Walters et al. |
| 2014/0254790 A1 | 9/2014 | Shaffer et al. |
| 2014/0257908 A1 | 9/2014 | Steiner et al. |
| 2014/0270108 A1 | 9/2014 | Riahi et al. |
| 2014/0270138 A1 | 9/2014 | Uba et al. |
| 2014/0270142 A1 | 9/2014 | Bischoff et al. |
| 2014/0270145 A1 | 9/2014 | Erhart et al. |
| 2014/0278605 A1 | 9/2014 | Borucki et al. |
| 2014/0278649 A1 | 9/2014 | Guerinik et al. |
| 2014/0279045 A1 | 9/2014 | Shottan et al. |
| 2014/0279050 A1 | 9/2014 | Makar et al. |
| 2014/0314225 A1 | 10/2014 | Riahi et al. |
| 2014/0335480 A1 | 11/2014 | Asenjo et al. |
| 2014/0372171 A1 | 12/2014 | Martin et al. |
| 2014/0379424 A1 | 12/2014 | Shroff |
| 2015/0006400 A1 | 1/2015 | Eng et al. |
| 2015/0010134 A1 | 1/2015 | Erel et al. |
| 2015/0012278 A1 | 1/2015 | Metcalf |
| 2015/0016600 A1 | 1/2015 | Desai et al. |
| 2015/0023484 A1 | 1/2015 | Ni et al. |
| 2015/0030151 A1 | 1/2015 | Bellini et al. |
| 2015/0030152 A1 | 1/2015 | Waxman et al. |
| 2015/0051957 A1 | 2/2015 | Griebeler et al. |
| 2015/0066632 A1 | 3/2015 | Gonzalez et al. |
| 2015/0071418 A1 | 3/2015 | Shaffer et al. |
| 2015/0078538 A1 | 3/2015 | Jain |
| 2015/0100473 A1 | 4/2015 | Manoharan et al. |
| 2015/0117632 A1 | 4/2015 | Konig et al. |
| 2015/0127400 A1 | 5/2015 | Chan et al. |
| 2015/0127441 A1 | 5/2015 | Feldman |
| 2015/0127677 A1 | 5/2015 | Wang et al. |
| 2015/0142704 A1 | 5/2015 | London |
| 2015/0172463 A1 | 6/2015 | Quast et al. |
| 2015/0178371 A1 | 6/2015 | Seth et al. |
| 2015/0195406 A1 | 7/2015 | Dwyer et al. |
| 2015/0213454 A1 | 7/2015 | Vedula |
| 2015/0215464 A1 | 7/2015 | Shaffer et al. |
| 2015/0222751 A1 | 8/2015 | Odinak et al. |
| 2015/0256677 A1 | 9/2015 | Konig et al. |
| 2015/0262188 A1 | 9/2015 | Franco |
| 2015/0262208 A1 | 9/2015 | Bjontegard et al. |
| 2015/0269377 A1 | 9/2015 | Gaddipati |
| 2015/0271334 A1 | 9/2015 | Wawrzynowicz |
| 2015/0281445 A1 | 10/2015 | Kumar et al. |
| 2015/0281449 A1 | 10/2015 | Milstein et al. |
| 2015/0281450 A1 | 10/2015 | Shapiro et al. |
| 2015/0281454 A1 | 10/2015 | Milstein et al. |
| 2015/0287410 A1 | 10/2015 | Mengibar et al. |
| 2015/0295788 A1 | 10/2015 | Witzman et al. |
| 2015/0296081 A1 | 10/2015 | Jeong |
| 2015/0302301 A1 | 10/2015 | Petersen |
| 2015/0334230 A1 | 11/2015 | Volzke |
| 2015/0339446 A1 | 11/2015 | Sperling et al. |
| 2015/0339620 A1 | 11/2015 | Esposito et al. |
| 2015/0339769 A1 | 11/2015 | Deoliveira et al. |
| 2015/0347900 A1 | 12/2015 | Bell et al. |
| 2015/0350429 A1 | 12/2015 | Kumar et al. |
| 2015/0350440 A1 | 12/2015 | Steiner et al. |
| 2015/0350442 A1 | 12/2015 | O'connor |
| 2015/0350443 A1 | 12/2015 | Kumar et al. |
| 2015/0379562 A1 | 12/2015 | Spievak et al. |
| 2016/0026629 A1 | 1/2016 | Clifford et al. |
| 2016/0034260 A1 | 2/2016 | Ristock et al. |
| 2016/0034995 A1 | 2/2016 | Williams et al. |
| 2016/0036981 A1 | 2/2016 | Hollenberg et al. |
| 2016/0036983 A1 | 2/2016 | Korolev et al. |
| 2016/0042419 A1 | 2/2016 | Singh |
| 2016/0042749 A1 | 2/2016 | Hirose |
| 2016/0055499 A1 | 2/2016 | Hawkins et al. |
| 2016/0057284 A1 | 2/2016 | Nagpal et al. |
| 2016/0065739 A1 | 3/2016 | Brimshan et al. |
| 2016/0080567 A1 | 3/2016 | Hooshiari et al. |
| 2016/0085891 A1 | 3/2016 | Ter et al. |
| 2016/0112867 A1 | 4/2016 | Martinez |
| 2016/0124937 A1 | 5/2016 | Elhaddad |
| 2016/0125456 A1 | 5/2016 | Wu et al. |
| 2016/0134624 A1 | 5/2016 | Jacobson et al. |
| 2016/0140627 A1 | 5/2016 | Moreau et al. |
| 2016/0150086 A1 | 5/2016 | Pickford |
| 2016/0155080 A1 | 6/2016 | Gnanasambandam et al. |
| 2016/0162478 A1 | 6/2016 | Blassin et al. |
| 2016/0171422 A1 | 6/2016 | Wicaksono et al. |
| 2016/0173692 A1 | 6/2016 | Wicaksono et al. |
| 2016/0180381 A1 | 6/2016 | Kaiser et al. |
| 2016/0191699 A1 | 6/2016 | Agrawal et al. |
| 2016/0191709 A1 | 6/2016 | Pullamplavil et al. |

(56) References Cited

U.S. PATENT DOCUMENTS

| | | |
|---|---|---|
| 2016/0191712 A1 | 6/2016 | Bouzid et al. |
| 2016/0234386 A1 | 8/2016 | Wawrzynowicz |
| 2016/0247165 A1 | 8/2016 | Ryabchun et al. |
| 2016/0261747 A1 | 9/2016 | Thirugnanasundaram et al. |
| 2016/0295018 A1 | 10/2016 | Loftus et al. |
| 2016/0295020 A1 | 10/2016 | Shaffer et al. |
| 2016/0300573 A1 | 10/2016 | Carbune et al. |
| 2016/0335576 A1 | 11/2016 | Peng |
| 2016/0349960 A1 | 12/2016 | Kumar et al. |
| 2016/0358611 A1 | 12/2016 | Abel |
| 2016/0360033 A1 | 12/2016 | Kocan |
| 2016/0360336 A1 | 12/2016 | Gross et al. |
| 2016/0378569 A1 | 12/2016 | Ristock et al. |
| 2016/0381222 A1 | 12/2016 | Ristock et al. |
| 2017/0004178 A1 | 1/2017 | Ponting et al. |
| 2017/0006135 A1 | 1/2017 | Siebel et al. |
| 2017/0006161 A9 | 1/2017 | Riahi et al. |
| 2017/0011311 A1 | 1/2017 | Backer et al. |
| 2017/0024762 A1 | 1/2017 | Swaminathan |
| 2017/0032436 A1 | 2/2017 | Disalvo et al. |
| 2017/0034226 A1 | 2/2017 | Bostick et al. |
| 2017/0068436 A1 | 3/2017 | Auer et al. |
| 2017/0068854 A1 | 3/2017 | Markiewicz et al. |
| 2017/0098197 A1 | 4/2017 | Yu et al. |
| 2017/0104875 A1 | 4/2017 | Im et al. |
| 2017/0111505 A1 | 4/2017 | Mcgann et al. |
| 2017/0111507 A1 | 4/2017 | McGann et al. |
| 2017/0111509 A1 | 4/2017 | Mcgann et al. |
| 2017/0116173 A1 | 4/2017 | Lev-Tov et al. |
| 2017/0118336 A1 | 4/2017 | Tapuhi et al. |
| 2017/0132536 A1 | 5/2017 | Goldstein et al. |
| 2017/0148073 A1 | 5/2017 | Nomula et al. |
| 2017/0155766 A1 | 6/2017 | Kumar et al. |
| 2017/0161439 A1 | 6/2017 | Raduchel et al. |
| 2017/0162197 A1 | 6/2017 | Cohen |
| 2017/0169325 A1 | 6/2017 | Mccord et al. |
| 2017/0207916 A1 | 7/2017 | Luce et al. |
| 2017/0214795 A1 | 7/2017 | Charlson |
| 2017/0220966 A1 | 8/2017 | Wang |
| 2017/0223070 A1 | 8/2017 | Lin |
| 2017/0236512 A1 | 8/2017 | Williams et al. |
| 2017/0286774 A1 | 10/2017 | Gaidon |
| 2017/0288866 A1 | 10/2017 | Vanek et al. |
| 2017/0308794 A1 | 10/2017 | Fischerstrom |
| 2017/0316386 A1 | 11/2017 | Joshi et al. |
| 2017/0323344 A1 | 11/2017 | Nigul |
| 2017/0337578 A1 | 11/2017 | Chittilappilly et al. |
| 2017/0344754 A1 | 11/2017 | Kumar et al. |
| 2017/0344988 A1 | 11/2017 | Cusden et al. |
| 2017/0359421 A1 | 12/2017 | Stoops et al. |
| 2017/0372436 A1 | 12/2017 | Dalal et al. |
| 2018/0018705 A1 | 1/2018 | Tognetti |
| 2018/0032997 A1 | 2/2018 | Gordon et al. |
| 2018/0052664 A1 | 2/2018 | Zhang et al. |
| 2018/0053401 A1 | 2/2018 | Martin et al. |
| 2018/0054464 A1 | 2/2018 | Zhang et al. |
| 2018/0060830 A1 | 3/2018 | Abramovici et al. |
| 2018/0061256 A1 | 3/2018 | Elchik et al. |
| 2018/0077088 A1 | 3/2018 | Cabrera-Cordon et al. |
| 2018/0077250 A1 | 3/2018 | Prasad et al. |
| 2018/0083898 A1 | 3/2018 | Pham |
| 2018/0097910 A1 | 4/2018 | D'Agostino et al. |
| 2018/0114234 A1 | 4/2018 | Fighel |
| 2018/0121766 A1 | 5/2018 | Mccord et al. |
| 2018/0137472 A1 | 5/2018 | Gorzela et al. |
| 2018/0137555 A1 | 5/2018 | Clausse et al. |
| 2018/0146093 A1 | 5/2018 | Kumar et al. |
| 2018/0150749 A1 | 5/2018 | Wu et al. |
| 2018/0152558 A1 | 5/2018 | Chan et al. |
| 2018/0164259 A1 | 6/2018 | Liu et al. |
| 2018/0165062 A1 | 6/2018 | Yoo et al. |
| 2018/0165691 A1 | 6/2018 | Heater et al. |
| 2018/0165692 A1 | 6/2018 | Mccoy |
| 2018/0165723 A1 | 6/2018 | Wright et al. |
| 2018/0174198 A1 | 6/2018 | Wilkinson et al. |
| 2018/0189273 A1 | 7/2018 | Campos et al. |
| 2018/0190144 A1 | 7/2018 | Corelli et al. |
| 2018/0198917 A1 | 7/2018 | Ristock et al. |
| 2018/0205825 A1 | 7/2018 | Vymenets et al. |
| 2018/0248818 A1 | 8/2018 | Zucker et al. |
| 2018/0248895 A1 | 8/2018 | Watson et al. |
| 2018/0260857 A1 | 9/2018 | Kar et al. |
| 2018/0285423 A1 | 10/2018 | Ciano et al. |
| 2018/0286000 A1 | 10/2018 | Berry et al. |
| 2018/0293327 A1 | 10/2018 | Miller et al. |
| 2018/0293532 A1 | 10/2018 | Singh et al. |
| 2018/0300295 A1 | 10/2018 | Maksak et al. |
| 2018/0300641 A1 | 10/2018 | Donn et al. |
| 2018/0308072 A1 | 10/2018 | Smith et al. |
| 2018/0309801 A1 | 10/2018 | Rathod |
| 2018/0349858 A1 | 12/2018 | Walker et al. |
| 2018/0361253 A1 | 12/2018 | Grosso |
| 2018/0365651 A1 | 12/2018 | Sreedhara et al. |
| 2018/0367672 A1 | 12/2018 | Ristock et al. |
| 2018/0372486 A1 | 12/2018 | Farniok et al. |
| 2018/0376002 A1 | 12/2018 | Abraham |
| 2019/0013017 A1 | 1/2019 | Kang et al. |
| 2019/0020757 A1 | 1/2019 | Rao et al. |
| 2019/0028587 A1 | 1/2019 | Unitt et al. |
| 2019/0028588 A1 | 1/2019 | Shinseki et al. |
| 2019/0037077 A1 | 1/2019 | Konig et al. |
| 2019/0042988 A1 | 2/2019 | Brown et al. |
| 2019/0043106 A1 | 2/2019 | Talmor et al. |
| 2019/0058793 A1 | 2/2019 | Konig et al. |
| 2019/0104092 A1 | 4/2019 | Koohmarey et al. |
| 2019/0108834 A1 | 4/2019 | Nelson et al. |
| 2019/0124202 A1 | 4/2019 | Dubey et al. |
| 2019/0130329 A1 | 5/2019 | Fama et al. |
| 2019/0132443 A1 | 5/2019 | Munns et al. |
| 2019/0146647 A1 | 5/2019 | Ramachandran et al. |
| 2019/0147045 A1 | 5/2019 | Kim |
| 2019/0172291 A1 | 6/2019 | Naseath |
| 2019/0180095 A1 | 6/2019 | Ferguson et al. |
| 2019/0180747 A1 | 6/2019 | Back et al. |
| 2019/0182383 A1 | 6/2019 | Shaev et al. |
| 2019/0196676 A1 | 6/2019 | Hillis et al. |
| 2019/0197568 A1 | 6/2019 | Li et al. |
| 2019/0205389 A1 | 7/2019 | Tripathi et al. |
| 2019/0236205 A1 | 8/2019 | Jia et al. |
| 2019/0238680 A1 | 8/2019 | Narayanan et al. |
| 2019/0253553 A1 | 8/2019 | Chishti |
| 2019/0258825 A1 | 8/2019 | Krishnamurthy |
| 2019/0287517 A1 | 9/2019 | Green et al. |
| 2019/0295027 A1 | 9/2019 | Dunne et al. |
| 2019/0306315 A1 | 10/2019 | Portman et al. |
| 2019/0335038 A1 | 10/2019 | Alonso Y Caloca et al. |
| 2019/0341030 A1 | 11/2019 | Hammons et al. |
| 2019/0342450 A1 | 11/2019 | Kulkarni et al. |
| 2019/0349477 A1 | 11/2019 | Kotak |
| 2019/0377789 A1 | 12/2019 | Jegannathan et al. |
| 2019/0378076 A1 | 12/2019 | O'Gorman et al. |
| 2019/0385597 A1 | 12/2019 | Katsamanis et al. |
| 2019/0386917 A1 | 12/2019 | Malin |
| 2019/0392357 A1 | 12/2019 | Surti et al. |
| 2019/0394333 A1 | 12/2019 | Jiron et al. |
| 2020/0005375 A1 | 1/2020 | Sharan et al. |
| 2020/0007680 A1 | 1/2020 | Wozniak |
| 2020/0012697 A1 | 1/2020 | Fan et al. |
| 2020/0012992 A1 | 1/2020 | Chan et al. |
| 2020/0019893 A1 | 1/2020 | Lu |
| 2020/0028968 A1 | 1/2020 | Mendiratta et al. |
| 2020/0050788 A1 | 2/2020 | Feuz et al. |
| 2020/0050996 A1 | 2/2020 | Generes, Jr. et al. |
| 2020/0058299 A1 | 2/2020 | Lee et al. |
| 2020/0076947 A1 | 3/2020 | Deole |
| 2020/0097544 A1 | 3/2020 | Alexander et al. |
| 2020/0104801 A1 | 4/2020 | Kwon et al. |
| 2020/0118215 A1 | 4/2020 | Rao et al. |
| 2020/0119936 A1 | 4/2020 | Balasaygun et al. |
| 2020/0125919 A1 | 4/2020 | Liu et al. |
| 2020/0126126 A1 | 4/2020 | Briancon et al. |
| 2020/0128130 A1 | 4/2020 | Geary |
| 2020/0134492 A1 | 4/2020 | Copeland |
| 2020/0134648 A1 | 4/2020 | Qi et al. |

(56) References Cited

U.S. PATENT DOCUMENTS

| | | | |
|---|---|---|---|
| 2020/0137097 A1 | 4/2020 | Zimmermann et al. |
| 2020/0154170 A1 | 5/2020 | Wu et al. |
| 2020/0160870 A1 | 5/2020 | Baughman et al. |
| 2020/0175478 A1 | 6/2020 | Lee et al. |
| 2020/0193335 A1 | 6/2020 | Sekhar et al. |
| 2020/0193983 A1 | 6/2020 | Choi |
| 2020/0211120 A1 | 7/2020 | Wang et al. |
| 2020/0218766 A1 | 7/2020 | Yaseen et al. |
| 2020/0219500 A1 | 7/2020 | Bender et al. |
| 2020/0242540 A1 | 7/2020 | Rosati et al. |
| 2020/0250272 A1 | 8/2020 | Kantor et al. |
| 2020/0250557 A1 | 8/2020 | Kishimoto et al. |
| 2020/0257996 A1 | 8/2020 | London |
| 2020/0280578 A1 | 9/2020 | Hearty et al. |
| 2020/0280635 A1 | 9/2020 | Barinov et al. |
| 2020/0285936 A1 | 9/2020 | Sen |
| 2020/0329154 A1 | 10/2020 | Baumann et al. |
| 2020/0336567 A1 | 10/2020 | Dumaine |
| 2020/0342868 A1 | 10/2020 | Lou et al. |
| 2020/0351375 A1 | 11/2020 | Lepore et al. |
| 2020/0351405 A1 | 11/2020 | Pace |
| 2020/0357026 A1 | 11/2020 | Liu et al. |
| 2020/0364507 A1 | 11/2020 | Berry |
| 2020/0365148 A1 | 11/2020 | Ji et al. |
| 2020/0380451 A1 | 12/2020 | Izadi |
| 2020/0395008 A1 | 12/2020 | Cohen et al. |
| 2020/0410506 A1 | 12/2020 | Jones et al. |
| 2021/0004536 A1 | 1/2021 | Adibi et al. |
| 2021/0005206 A1 | 1/2021 | Adibi et al. |
| 2021/0042839 A1 | 2/2021 | Adamec |
| 2021/0056481 A1 | 2/2021 | Wicaksono et al. |
| 2021/0067627 A1 | 3/2021 | Delker et al. |
| 2021/0073819 A1 | 3/2021 | Hernandez et al. |
| 2021/0081869 A1 | 3/2021 | Zeelig et al. |
| 2021/0081955 A1 | 3/2021 | Zeelig et al. |
| 2021/0082417 A1 | 3/2021 | Zeelig et al. |
| 2021/0082418 A1 | 3/2021 | Zeelig et al. |
| 2021/0084149 A1 | 3/2021 | Zeelig et al. |
| 2021/0089762 A1 | 3/2021 | Rahimi et al. |
| 2021/0090570 A1 | 3/2021 | Aharoni et al. |
| 2021/0091996 A1 | 3/2021 | Mcconnell et al. |
| 2021/0105361 A1 | 4/2021 | Bergher et al. |
| 2021/0124843 A1 | 4/2021 | Vass et al. |
| 2021/0125275 A1 | 4/2021 | Adibi |
| 2021/0133763 A1 | 5/2021 | Adibi et al. |
| 2021/0133765 A1 | 5/2021 | Adibi et al. |
| 2021/0134282 A1 | 5/2021 | Adibi et al. |
| 2021/0134283 A1 | 5/2021 | Adibi et al. |
| 2021/0134284 A1 | 5/2021 | Adibi et al. |
| 2021/0136198 A1 | 5/2021 | Leavitt et al. |
| 2021/0136204 A1 | 5/2021 | Adibi et al. |
| 2021/0136205 A1 | 5/2021 | Adibi et al. |
| 2021/0136206 A1 | 5/2021 | Adibi et al. |
| 2021/0201244 A1 | 7/2021 | Sella et al. |
| 2021/0201359 A1 | 7/2021 | Sekar et al. |
| 2021/0295237 A1 | 9/2021 | Taher et al. |
| 2021/0405897 A1 | 12/2021 | Hansalia |
| 2022/0114200 A1* | 4/2022 | Johnston ............... H04M 3/527 |
| 2022/0114593 A1 | 4/2022 | Johnson et al. |
| 2022/0114594 A1 | 4/2022 | Nunes et al. |
| 2022/0116415 A1 | 4/2022 | Burgis et al. |
| 2022/0122182 A1 | 4/2022 | Marshall et al. |
| 2022/0129905 A1 | 4/2022 | Sethumadhavan et al. |
| 2022/0398682 A1 | 12/2022 | Tam et al. |
| 2023/0007123 A1 | 1/2023 | Krucek et al. |
| 2023/0107335 A1 | 4/2023 | Garyani et al. |

FOREIGN PATENT DOCUMENTS

| | | |
|---|---|---|
| SU | 1732352 A1 | 5/1992 |
| WO | 2006/037836 A1 | 4/2006 |
| WO | 2012/024316 A2 | 2/2012 |
| WO | 2015/099587 A1 | 7/2015 |
| WO | 2019142743 A1 | 7/2019 |

OTHER PUBLICATIONS

Fan et al., "Demystifying Big Data Analytics for Business Intelligence Through the Lens of Marketing Mix", Big Data Research, vol. 2, Issue 1, Mar. 1, 2015, 16 pages.

An et al., Towards Automatic Persona Generation Using Social Media Aug. 1, 2016, 2016 IEEE 4th International Conference on Future Internet of Things and Cloud Workshops (FiCloudW), 2 pages.

Bean-Mellinger, Barbara., "What Is the Difference Between Marketing and Advertising?", available on Feb. 12, 2019, retrieved from https://smallbusiness.chron .com/difference-between-marketing-advertising-2504 7 .html, Feb. 12, 2019, 6 pages.

Twin, Alexandra., "Marketing", URL: https://www.investopedia.com/lerms/m/marketing.asp, Mar. 29, 2019, 5 pages.

dictionary.com, "Marketing", URL: https://www.dictionary.com/browse/marketing, Apr. 6, 2019, 7 pages.

Ponn et al., "Correlational Analysis between Weather and 311 Service Request Volume", eil.mie.utoronto.ca., Jan. 1, 2017, 16 pages.

Zhang et al., "A Bayesian approach for modeling and analysis of call center arrivals", Jan. 1, 2013 Winter Simulations Conference (WSC), ieeexplore.ieee.org, pp. 713-723.

Mehrotra et al., "Call Center Simulation Modeling: Methods, Challenges, and Opportunities" Proceedings of the 2003 Winter Simulation Conference, vol. 1, Jan. 1, 2003, pp. 135-143.

Mandelbaum et al., "Staffing Many-Server Queues with Impatient Customers: Constraint Satisfaction in Call Center", Operations Research, Sep.-Oct. 2009, vol. 57, No. 5 (Sep. 1-Oct. 2009), pp. 1189-1205.

Fukunaga et al., "Staff Scheduling for Inbound Call Centers and Customer Contact Centers", AI Magazine, Winter, vol. 23, No. 4, Jan. 1, 2002, pp. 30-40.

Feldman et al., "Staffing of Time-Varying Queues to Achieve Time-Stable Performance", Management Science, Feb. 1, 2008, vol. 54, No. 2, Call Center Management, pp. 324-338.

Business Wire, "Rockwell SSD announces Call Center Simulator", Feb. 4, 1997, 4 pages.

Stearns, "Using skills-based routing to the advantage of your contact center", Customer Inter@ction Solutions, Technology Marketing Corporation, May 1, 2001, vol. 19 No. 11, pp. 54-56.

Aksin et al., "The Modern Call Center: A Multi-Disciplinary Perspective on Operations Management Research", Production and Operations Management, 2007, vol. 16, No. 6, pp. 665-688.

Aldor-Noiman, et al., "Workload forecasting for a call center: Methodology and a case study." The Annals of Applied Statistics 3.4 (2009); 1403-1447.

Buesing et al., "Getting the Best Customer Service from your IVR: Fresh eyes on an old problem," [online] McKinsey and Co., published on Feb. 1, 2019, available at: < https://www.nnckinsey.conn/business-functions/operations/our-insights/ getting-the-best-customer-service-from-your-ivr-fresh-eyes . . . (Year: 2019).

Chiu et al., "A multi-agent infrastructure for mobile workforce management in a service oriented enterprise", Proceedings of the 38th annual Hawaii international conference on system sciences, IEEE, 2005, pp. 10.

Krishnan, Krish, "Data Warehousing in the Age of Big Data", Morgan Kaufmann, Chapter 5, 2013, 28 pages.

Diimitrios et al., "An overview of workflow management: From process modeling to workflow automation infrastructure," Distributed and parallel Databases, 1995, vol. 3, No. 2 pp. 119-153.

Ernst et al. "An Annotated Bibliography of Personnel Scheduling and Rostering", CSIRO Mathematical and Information Sciences, 2003, 155 pages.

Ernst et al., "Staff scheduling and rostering: A review of applications, methods and models," European Journal of Operational Research, 2004, vol. 153, pp. 3-27.

Federal Register, vol. 72, No. 195, Oct. 10, 2007, pp. 57526-57535.
Federal Register, vol. 75, No. 169, Sep. 1, 2010, pp. 53643-53660.
Federal register, vol. 79, No. 241 issued on Dec. 16, 2014, p. 74629, col. 2, Gottschalk v. Benson.
Federal Register, vol. 84, No. 4, Jan. 7, 2019, pp. 50-57.

(56) References Cited

OTHER PUBLICATIONS

Federal Register, vol. 84, No. 4, Jan. 7, 2019, p. 53-55.
Grefen et al., "A reference architecture for workflow management systems", Data & Knowledge Engineering, 1998, vol. 27, No. 1, pp. 31-57.
https://www.uspto.gov/patent/laws-and-regulations/examination-policy/examination-guidelines-training-materials-view- ksr, signed Aug. 20, 2010.
Huang et al., "Agent-based workflow management in collaborative product development on the Internet", Computer-Aided Design, 2000, vol. 32, No. 2, pp. 133-144.
Janarthanam, "Hands on Chatbots and conversational UI development: Build chatbots and voice user interfaces with Chatfuel, Dialogflow, Microsoft Bot Framework, Twilio, and Alexa Skills" Dec. 2017.
Koole, et al., "An overview of routing and staffing algorithms in multi-skill customer contact centers." 2006.
Myers et al., "At the Boundary of Workflow and AI", Proc. AAAI 1999 Workshop on Agent-Based Systems in the Business Context, 1999, 09 pages.
Niven, "Can music with prosocial lyrics heal the working world? A field intervention in a call center." Journal of Applied Social Psychology, 2015; 45(3), 132-138. doi: 10.1111/jasp.12282 ).
On Hold Marketing, "Growing Your Business with Customized on-Hold Messaging" (Published on Apr. 5, 2018 at https://adhq.com/about/ad-news/growing-your-business-with-customized-on-hold-messaging) (Year: 2018).
U.S. Appl. No. 16/668,214, NFOA mailed Nov. 10, 2021.
U.S. Appl. No. 16/668,215, NFOA mailed Dec. 7, 2021.
Van Den Bergh et al. "Personnel scheduling: A literature review", European journal of operational research, 2013, vol. 226, No. 3 pp. 367-385.
United States Patent and Trademark Office, Non-Final Office Action for U.S. Appl. No. 16/550,961 mailed Mar. 2, 2020.
United States Patent and Trademark Office, Final Office Action for U.S. Appl. No. 16/550,961 mailed Jun. 17, 2020.
An, J., Kwak, H. and Jansen, B.J., ip.com, Nov. 2016. "Validating social media data for automatic persona generation", English Abstract, In 2016 IEEE/ACS 13th International Conference of Computer Systems and Applications (AICCSA), 2 pages.
European Search Report in corresponding European Application No. 22178124 dated Oct. 20, 2022.

\* cited by examiner

METHOD AND APPARATUS FOR CREATING A DATABASE OF CONTACT CENTER RESPONSE RECORDS

BACKGROUND

Contact centers, in which incoming communications from inquiring parties (such as customers) are routed to agents, are well known. FIG. 1 is an example system architecture of a cloud-based contact center platform. Customers 110, i.e., parties originating incoming communications to a contact center, interact with the contact center 150 using voice, email, text, web, chat and other channels to communicate with the agents 120 through a network 130. Note that the term "customer", as used herein, refers to a party contacting the contact center for service, information, or the like and includes actual purchasers, potential purchasers, and other parties.

Contact center 150 includes computing modules for the routing communications from customers 110 to agents 120 for the contact center 150. These modules are referred to herein as the contact routing system 140. The contact routing system 140 could be any of a contact center as a service (CCaaS) system, an automated call distributor (ACD) system, or a case system, for example.

Agents 120 may be remote from the contact center 150 and handle communications (also referred to as "conversations" herein) with customers 110 on behalf of an enterprise or other entity. Agents 120 may utilize devices, such as work stations, desktop computers, laptops, telephones, a mobile smartphone and/or a tablet. Similarly, customers 110 may communicate using a plurality of devices, including but not limited to, a telephone, a mobile smartphone, a tablet, a laptop, a desktop computer, or other devices. For example, telephone communication may traverse networks such as a public switched telephone networks (PSTN), Voice over Internet Protocol (VOIP) telephony (via the Internet), a Wide Area Network (WAN) or a Large Area Network (LAN). The network types are provided by way of example and are not intended to limit types of networks used for communications.

Agents 120 may be assigned to one or more "queues" representing communication categories and/or agent skill levels. Agents 120 assigned to a queue may handle communications that are placed in the queue by the contact routing system 140. For example, there may be queues associated with a language capability of the agent (e.g., English or Chinese), topic (e.g., technical support or billing), or a particular country of origin. When a communication is received by the contact routing system 140, the communication may be placed in a relevant queue, and one of agents 120 associated with the relevant queue may handle the communication. The communications may be assigned to an agent ("push communications") or selected by the agent out of the queue ("pull communications").

Agents 120 may be further organized into one or more teams based on a variety of factors including skills, location, experience, assigned queues, associated or assigned customers 110, and shift. The purpose of communication routing system 140 is to route communications to an agent who is likely to be able to handle the communication in an efficient manner and to the satisfaction of the customer who originated the communication.

Also It is known to use pre-defined messages, i.e., templates, when replying to customers to increase the agent's efficiency and present harmonized responses that are not dependent on the capabilities of the agent. Instead of writing all the messages from scratch, agents can use a library of predefined responses, stored in a knowledge base, to assist them while composing the answers for the communications. To be effective, template responses should be aligned with the company speech and the information must be as updated and accurate as possible, to make sure that the contact center is sharing the correct information with various systems.

"Virtual Agent" systems have been developed recently to provide fully automated answers, through messaging channels for example, to customers without the need for intervention by a human agent. Information changes rapidly and it is very cumbersome to get the information updated consistently when the same content is used for several different purposes in several different applications. If a customer changes the information to be shared with the agent, they need to get this information updated in several different systems, such as in virtual agent systems and live agent assist systems, in order to avoid inconsistency of data.

SUMMARY OF THE INVENTION

The disclosed implementations make templates available to agents in dynamic manner to allow agents to be more efficient while performing their daily job. A centralized database of templates is created in a novel manner to be used for multiple digital channels. The templates can be used and reused by multiple systems such as an agent assistant system or a virtual agent system, providing an integrated and consistent experience for responding to communications in a contact center. Templates can be initially created by content creators or administrators within a contact center system. These templates serve as pre-defined messages or responses for agents to use during customer interactions. During template creation, tags and metadata can be assigned to the templates to identify the intent and purpose of the template content. The tagging process ensures that templates are properly categorized and can be easily retrieved based on specific criteria. A guide API plays a role in integrating the template database with the contact center system and applications. The guide API enables seamless communication and synchronization between the template database and various components, such as an agent assist component and a virtual agent component. Once the templates are created, tagged, and stored in the database, the templates can be used by both an agent assist component and a virtual agent component. These AI-driven features utilize the tags and metadata to propose relevant template answers or responses to agents during customer interactions. This proactively assists agents by suggesting the most suitable template based on the context and intent of the conversation. As new customer interactions occur, feedback is collected from agents and customers. This feedback is then used to refine and improve the existing templates or create new ones. The database is updated accordingly to reflect these changes, ensuring that it remains up-to-date and aligned with evolving customer needs.

A first aspect is a method for creating a database of contact center template response records which can be used to provide contact center agents with responses to communications from customers, the method comprising: creating at least one response template data structure including at least one potential response to a customer communication; for each of the at least one response template data structure: (1) associating metadata with each of the at least one response template data structures, the metadata including one or more channels of communication relating to the at least one response template data structure, at least one keyword from the response of the at least one response template data structure, and a template group indicator; and (2) associating an intent tag with each of the at least one response template data structures, the intent tag being determined by an AI intent engine analyzing a specific communication between a contact center agent and a customer for which the contact center agent used the potential response of the at least one response template data structures as a response to the specific communication; and storing each of the at least one response template data structures with corresponding metadata and intent tags in a database of a knowledge management system that is used to provide contact center agents with responses to communications from customers.

A second aspect of the invention is a computer system for creating a database of contact center template response records which can be used to provide contact center agents with responses to communications from customers, the method comprises computer processors executing instructions that are stored in memory to accomplish a method of: creating at least one response template data structure including at least one potential response to a customer communication; for each of the at least one response template data structure: (1) associating metadata with each of the at least one response template data structures, the metadata including one or more channels of communication relating to the at least one response template data structure, at least one keyword from the response of the at least one response template data structure, and a template group indicator; and (2) associating an intent tag with each of the at least one response template data structures, the intent tag being determined by an AI intent engine analyzing a specific communication between a contact center agent and a customer for which the contact center agent used the potential response of the at least one response template data structures as a response to the specific communication; and storing each of the at least one response template data structures with corresponding metadata and intent tags in a database of a knowledge management system that is used to provide contact center agents with responses to communications from customers.

BRIEF DESCRIPTION OF THE DRAWINGS

The foregoing summary, as well as the following detailed description of the invention, will be better understood when read in conjunction with the appended drawings. For the purpose of illustrating the invention, there are shown in the appended drawings various illustrative embodiments. It should be understood, however, that the invention is not limited to the precise arrangements and instrumentalities shown. In the drawings.

DETAILED DESCRIPTION

Figure 1:
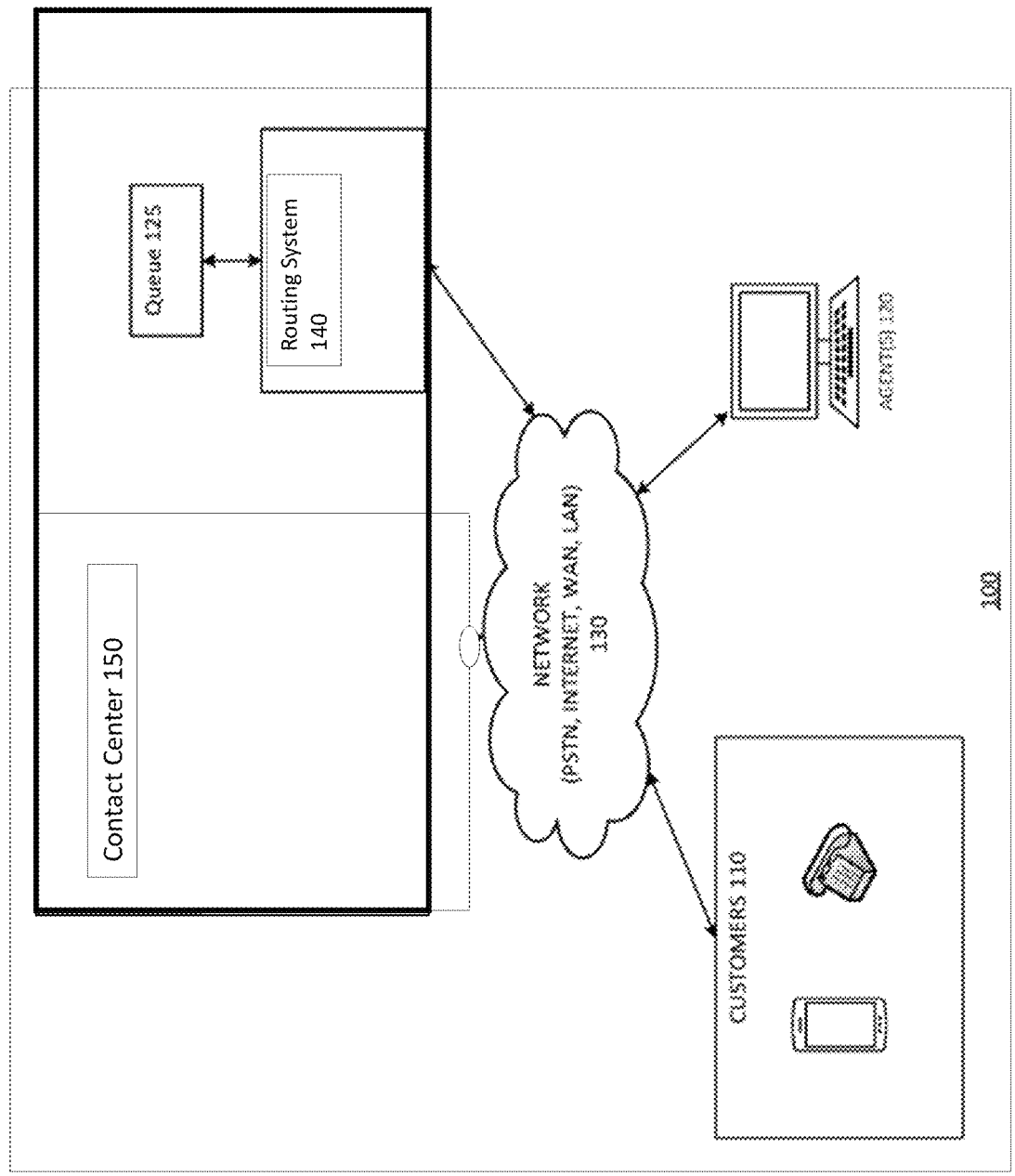
FIG. 1 is a block diagram of a contact center platform architecture.
Figure 2:
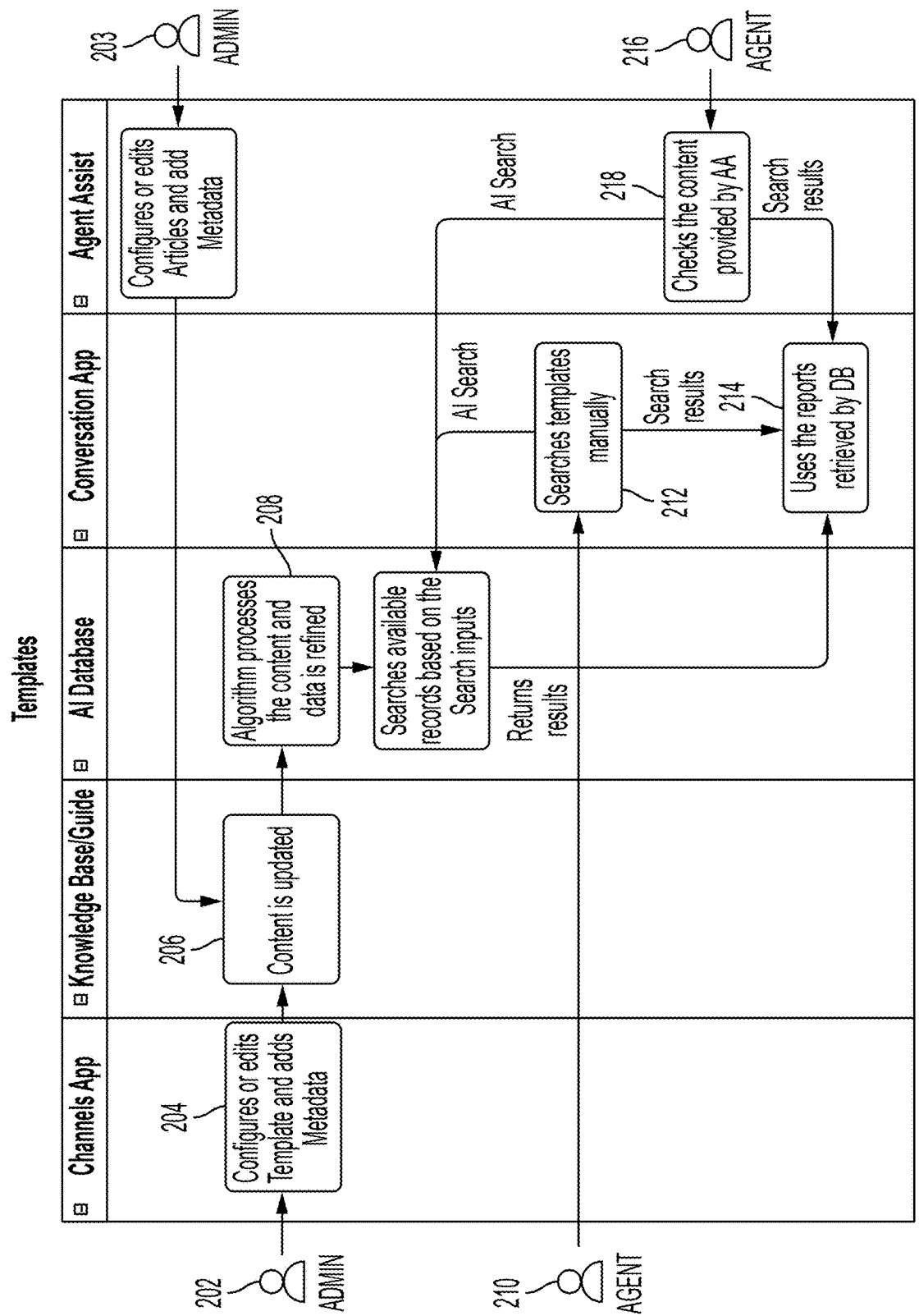
FIG. 2 is a flowchart of template workflows in accordance with disclosed implementations.

Disclosed implementations create and enhance templates as records in a database using tags that identify the intent of the content. The tags can be gathered from various remote systems. These tags are then used in live agent assist systems and/or in virtual agent systems. The templates can be used to propose content to live agents (thereby proactively assisting the contact center agent) and can be used as automated responses by virtual agents. Interactions by the live agents are used to enhance the tags and update the template records. FIG. 2 illustrates a workflow implementing templates in accordance with disclosed implementations. FIG. 2 illustrates three separate but related The first workflow is initiated by an administrator, at 202, to create a database record. At 204, an administrator uses an application having a user interface to configure or edit a template and/or add metadata to the template in the manner described in detail below. At 206, a database template record, including the response and the metadata is created and/or updated. At 208, the record is supplied to an artificial intelligence (AI) model and the AI model analyzes the intent and/or sentiment of the communications for which the template is used (in the workflows described below) and the AI database is updated based on the record to associate new content with the specific intent. Similarly, the administrator can configure or edit content records, such as relevant articles in the database at 203. The second workflow is initiated, at 210, by a live agent, during a communication for example, to retrieve a response from the database based on the communication that is being handled by the agent. At 212, an agent searches the database based using a query based on a current communication. At 214, the agent receives templates and/or other content (such as relevant articles) as search results and uses the search results to address an issue raised in the communication.

Stated differently, the query is used to locate one or more templates or other content records having a response or other information relevant to the communication and the response or other information is returned to the live agent to assist the live agent in addressing an issue raised in the communication being handled by the live agent. For example, the query can include keywords and topics from the conversation between the live agent and a customer. The third workflow is initiated at 216 by an agent who, for example, is not currently on a communication. At 218, this agent searches that database for articles and templates. In each instance, templates and other content, such as articles are enhanced by the AI algorithm and stored in the database.

The metadata that is stored in the record in association with the response language can include a channel indicator (channels can include voice, text, IM, chat . . . ), keywords, and collection information (such as links to related records). Further, the AI engine is used to determine the sentiment and/or intent of a communication and sentiment and/or intent data is stored as record metadata. This allows an AI engine, such as an AI engine used for a virtual assistant, to leverage a Knowledge Management (KM) database that is created for live agent assist applications, thus enhancing the data records in the KM database and allowing a virtual assistant AI engine to leverage the KM database. Stated differently, templates are created using tags that help identify the intent of the content. These tags are then used in live agent assist systems and/or virtual agent systems when proposing the content to the agent, pro-actively, assisting the contact center agent. All of these operations can be supported by an API.

Intent metadata added to the KM database can be indexed by the AI Search which adds AI capability to templates. AI search can leverage APIs that are used not just as a federated search over different knowledge bases (internal like Knowledge Management or external imported like Confluence, Zendesk, or even from external databases) but contains AI capabilities over searching and knowledge context, e.g., a cognitive search. Since the templates are built on top of the KM database suite, templates leverage KM capabilities.

Figure 3:
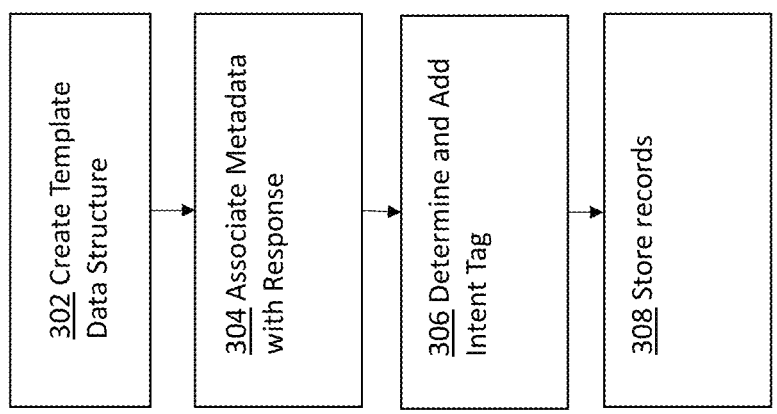
FIG. 3 is a flowchart of a process for creating database records in accordance with disclosed implementations.
Figure 4:
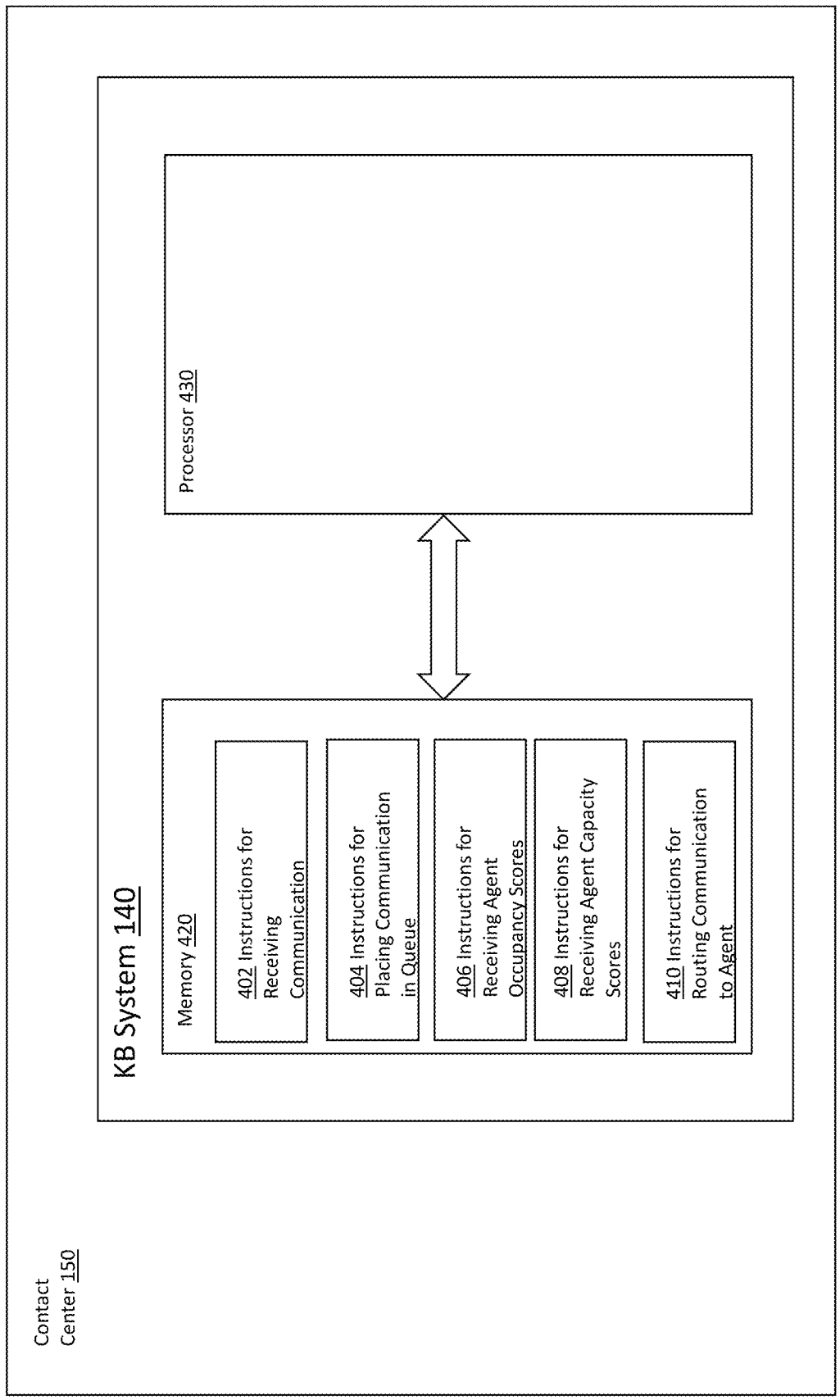
FIG. 4 is a computing system for creating database records in accordance with disclosed implementations.

FIG. 3 illustrates a method for creating the database records which can be used to provide contact center agents with responses to communications from customers. At step 302, at least one response template data structure, is created. The data structure includes at least one potential response to a customer communication. Steps 304 and 306 are then accomplished for each template data structure. At step 304, metadata is associated with the response in the template at which, when executed by processor 460 can accomplish the method of FIG. 3. Each code portion includes instructions which, when executed by processor 430 comprise a module that accomplishes a step of the method of FIG. 3. The code portions include code portion 402 corresponding to step 302 of FIG. 3, code portion 404 corresponding to step 304 of FIG. 3, code portion 406 corresponding to step 306 of FIG. 3, and code portion 408 corresponding to step 308 of FIG. 3. KB system 140 is illustrated as being part of contact center 150. However, KB system 140 can be separate from contact center 150 and provide a knowledge base for contact center 150 as a service, through a network and appropriate APIs and protocols. Various data from the remote systems of the contact center can be used by KB system 140 to enhance data records.

During a communication, the agent can access the knowledge base of templates by activating a user interface element, such as using a hotkey in an Email editor. When composing the outbound message, and without having the need to go to the templates list, the agent can activate the user interface element and/or enter a keyword and a list of templates associated with that keyword (through tags) will be listed. Since this is a cross-channel feature, only the templates suitable for the channel in context will be presented to the agent.

By activating a user interface element, such as clicking on a "Preview" button, the agent can check the template details and confirm if the template includes information relevant to the communication. Templates can be generic, which means that the same content can be used for different channels. Each template can be associated with one or more channels. An administrator can have the ability to order the templates so that the templates can be presented in a preferred order to the agents (live agent) or customer (virtual agent). The administrator can group templates together to aid in organizing and managing content that should be consistent. Manual tags can be added to templates during creation of management thereof by an administrator. Each template can belong to a collection and each collection can be associated with a specified language. This approach allows the templates to be grouped by the pair collection/language, which will allow administrators to organize the content correctly.

Each template can include a topic and messages/responses for each channel to allow different content to be surfaced for each channel. The agent can use a search interface to search for templates that contain specified keywords, topics, and/or contexts. Multiple templates can be selected by an agent to compose a more complex and complete response. Agents can search and select templates in a first language and the corresponding template responses in a second language can be presented to the customer to effectively provide communication translation. Various metrics can be gathered to more efficiently surface the most relevant template, such as how many times each agent accesses the template and how satisfied customers are with the associated response.

The disclosed implementations are an improvement over conventional systems because they provide:

Centralization and Reusability: By using a centralized Knowledge Management/Guide system, templates are stored in a single location. This centralized approach enables easy access and reuse of templates across multiple contact center applications. This eliminates the need for redundant content creation in different places, ensuring consistency and efficiency.

Consistency and Harmonization: The use of tags and metadata allows for consistent classification and organization of templates, ensuring that the same set of tags can be shared across different applications, databases, and technologies. This harmonization facilitates a standardized communication approach, regardless of the channel or agent handling the interaction.

Proactive Assistance and Efficiency: The integration of agent assist and virtual agent functionalities with the same database provides proactive assistance to agents. The AI-driven capabilities leverage the tags and metadata to suggest the most appropriate templates based on the context and intent of the conversation. This streamlines the agent's workflow, increases efficiency, and improves response accuracy.

Scalability and Agility: This approach offers scalability and agility, allowing for easy updates, additions, and modifications to templates. As customer needs change or new scenarios arise, the content can be adapted and expanded accordingly. This flexibility ensures that the templates remain relevant and effective over time.

Figure 5:
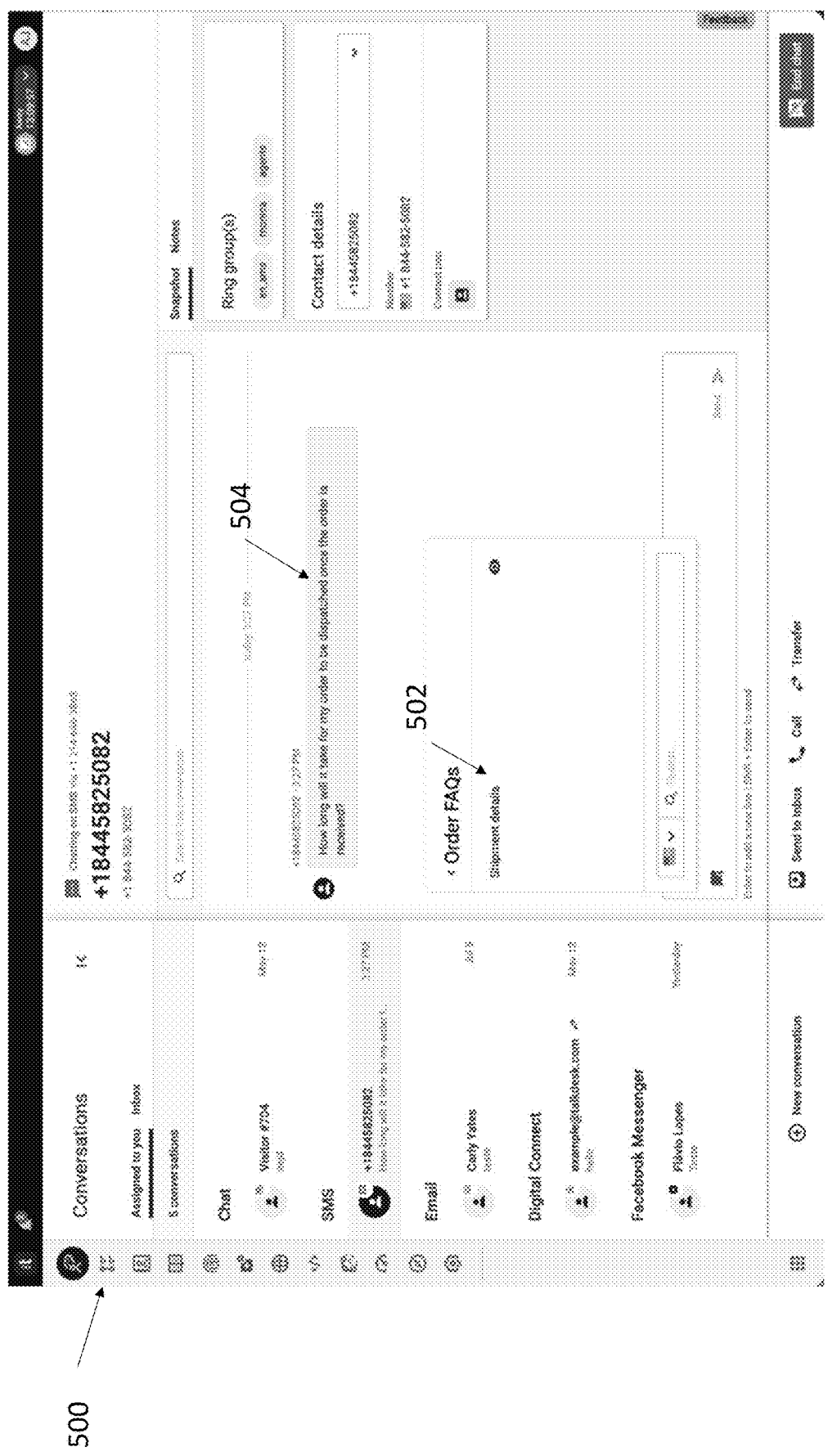
FIG. 5 illustrates an example of a user interface in accordance with disclosed implementations.
Figure 6:
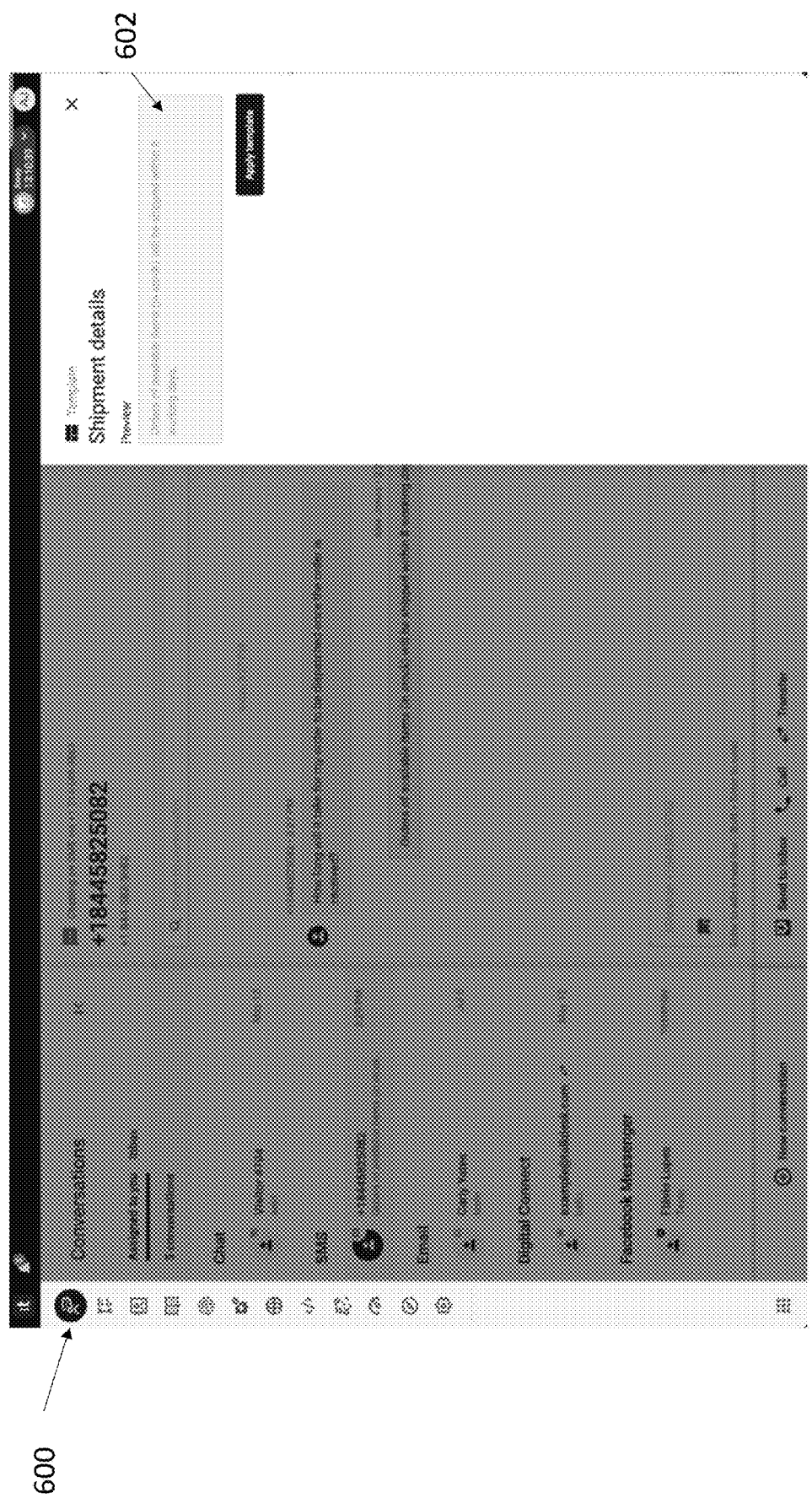
FIG. 6 illustrates and example of a user interface in accordance with disclosed implementations.
Figure 7:
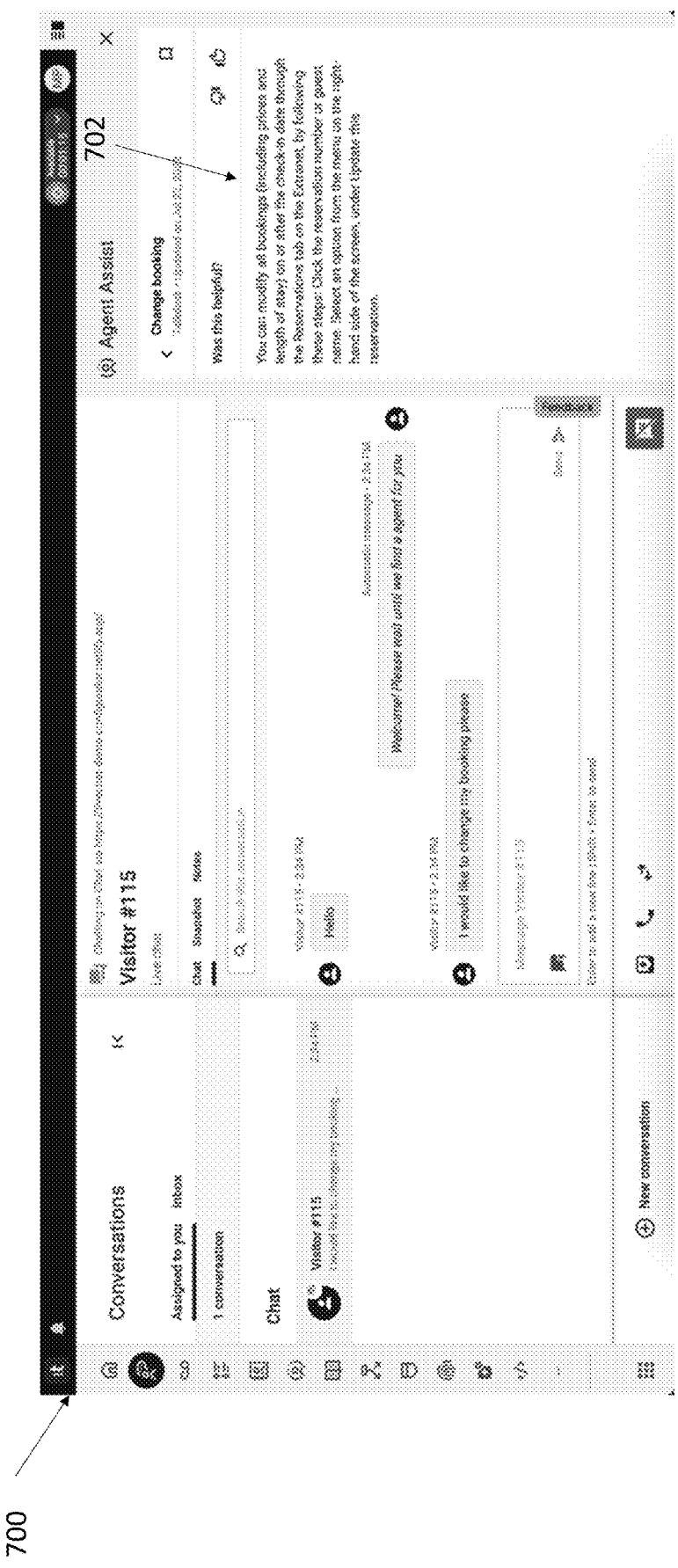
FIG. 7 illustrates and example of a user interface in accordance with disclosed implementations.
Figure 8:
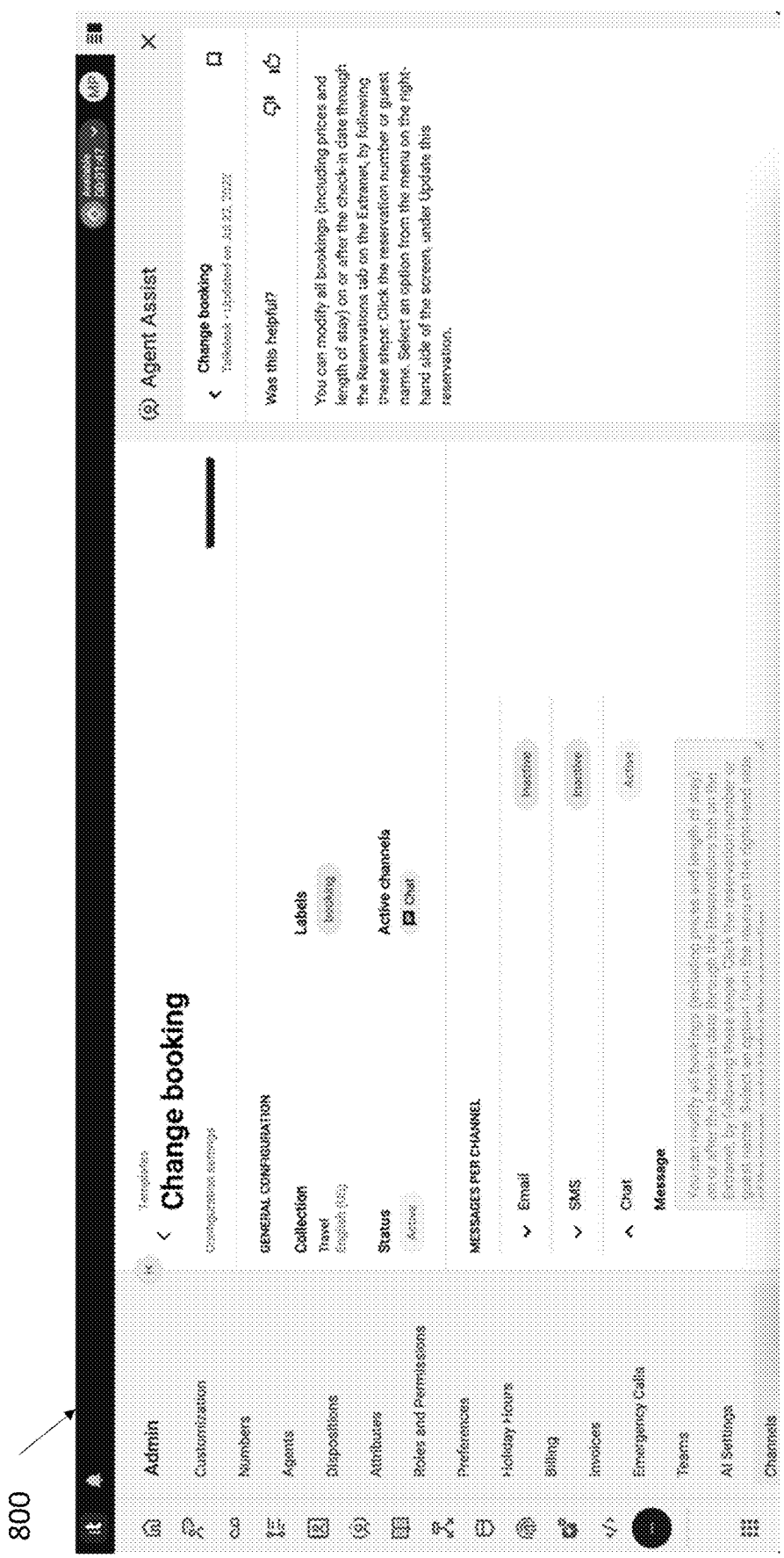
FIG. 8 illustrates an example of a user interface in accordance with disclosed
Figure 9:
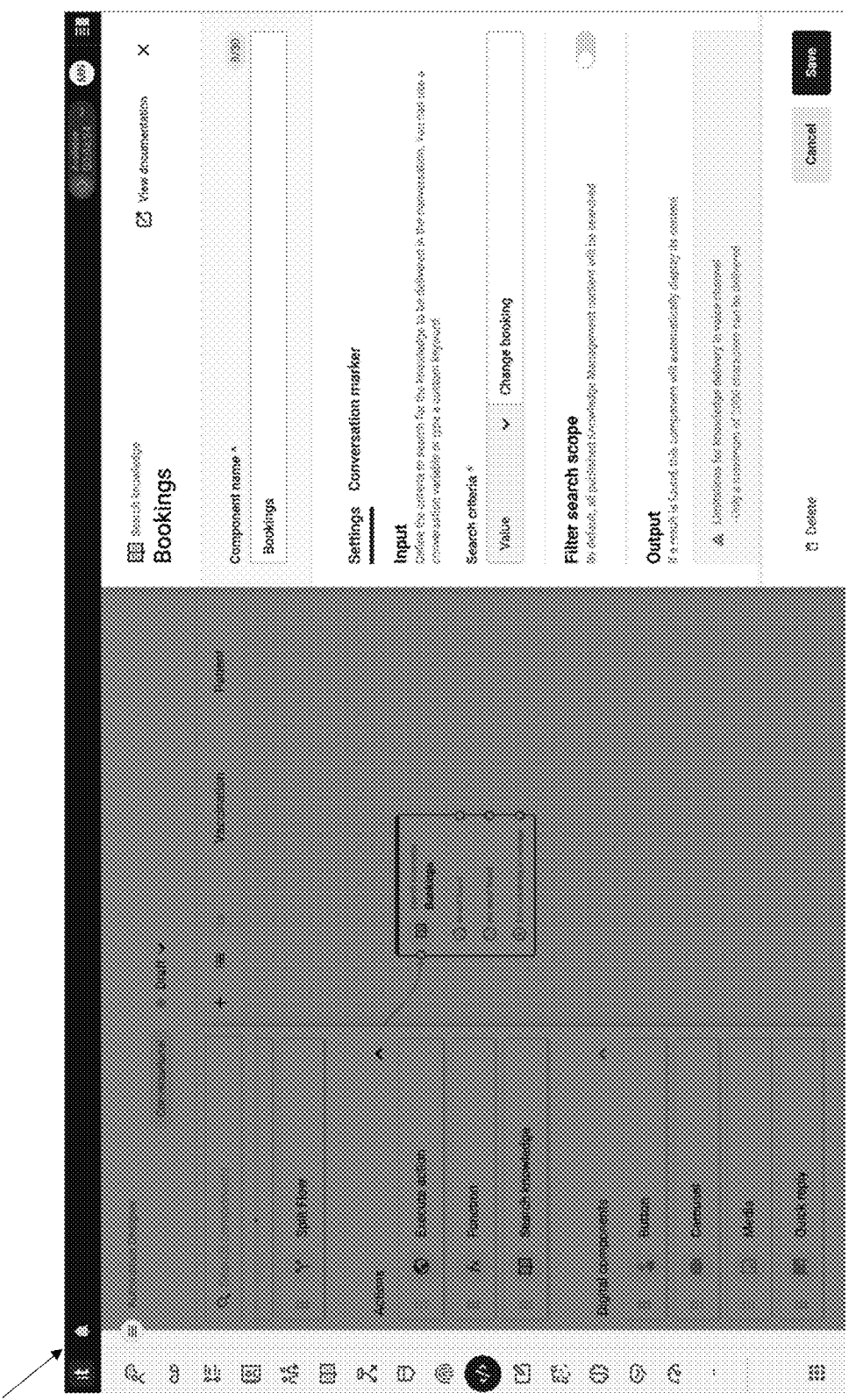
FIG. 9 illustrates an example of a user interface in accordance with disclosed implementations.

FIG. 5 shows an example of user interface 500 presented to an agent displaying one or more templates 502 to an agent that are relevant to question 504 asked by a customer over an sms channel. FIG. 6 shows an example of user interface 600 showing content details 602 of a template selected by the agent. FIG. 7 shows an example of user interface 700 from which record 702 is retrieved from an agent assist component. FIG. 8 shows an example of user interface 800 showing the back office/admin for templates management alongside the agent assist window wherein the same content is available in both virtual agent templates and agent assist templates. FIG. 9 shows an example of user interface 800 for searching templates in the agent assist mode.

The disclosed implementations can be implemented by various computing devices programmed with software and/or firmware to provide the disclosed functions and modules of executable code implemented by hardware. The software and/or firmware can be stored as executable code on one or more non-transient computer-readable media. The computing devices may be operatively linked via one or more electronic communication links. For example, such electronic communication links may be established, at least in part, via a network such as the Internet and/or other networks.

A given computing device may include one or more processors configured to execute computer program modules. The computer program modules may be configured to enable an expert or user associated with the given computing platform to interface with the system and/or external resources. By way of non-limiting example, the given computing platform may include one or more of a server, a desktop computer, a laptop computer, a handheld computer, a tablet computing platform, a Smartphone, a gaming console, and/or other computing platforms.

The various data and code can be stored in electronic storage devices which may comprise non-transitory storage media that electronically stores information. The electronic storage media of the electronic storage may include one or both of system storage that is provided integrally (i.e., substantially non-removable) with the computing devices and/or removable storage that is removably connectable to the computing devices via, for example, a port (e.g., a USB port, a firewire port, etc.) or a drive (e.g., a disk drive, etc.). The electronic storage may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media.

Processor(s) of the computing devices may be configured to provide information processing capabilities and may include one or more of a digital processor, an analog processor, a digital circuit designed to process information, an analog circuit designed to process information, a state machine, and/or other mechanisms for electronically processing information. As used herein, the term "module" may refer to any component or set of components that perform the functionality attributed to the module. This may include one or more physical processors during execution of processor readable instructions, the processor readable instructions, circuitry, hardware, storage media, or any other components.

It will be appreciated by those skilled in the art that changes could be made to the embodiments described above without departing from the broad inventive concept thereof. It is understood, therefore, that this invention is not limited to the particular embodiments disclosed, but it is intended to cover modifications within the spirit and scope of the present invention as defined by the appended claims.

What is claimed:

1. A method for creating a database of contact center response records which can be used to provide contact center agents with responses to communications from customers, the method comprising:
creating at least one response template data structure including at least one potential response to a customer communication;
for each of the at least one response template data structure:
associating metadata with each of the at least one response template data structures, the metadata including one or more channels of communication relating to the at least one response template data structure, at least one keyword from the at least one potential response of the at least one response template data structure, and a template group indicator; and
associating an intent tag with each of the at least one response template data structures, the intent tag identifying the intent of a communication and being determined by an AI intent engine analyzing a communication between a contact center agent and a customer for which the contact center agent used one or more of the at least one potential response of the at least one response template data structures as a response to the communication; and
storing each of the at least one response template data structures with corresponding metadata and intent tags in a database of a knowledge management system that is used to provide contact center agents with responses to communications from customers.

2. The method of claim 1, further comprising:
analyzing the content of a communication between a contact center agent and a customer;
conducting a search of the database with the AI engine to identify at least one response template data structure that corresponds to the communication; and
presenting the potential response of the at least one response template data structure that corresponds to the communication as a response to the communication.

3. The method of claim 1, wherein the step of associating an intent tag is repeated for multiple specific communications between contact center agents and customers.

4. The method of claim 1, wherein the database includes data records from additional resources.

5. The method of claim 4, wherein the additional resources are at least one of a CRM system, an accounting system, and an interaction records system.

6. A distributed computing system for creating a database of contact center response records which can be used to provide contact center agents with responses to communications from customers, the system comprising:
at least one computer hardware processor; and
at least one memory device operatively coupled to the at least one computer hardware processor and storing computer-readable instructions which, when executed by the at least one computer hardware processor, carry out a method of:
creating at least one response template data structure including at least one potential response to a customer communication;
for each of the at least one response template data structure:
associating metadata with each of the at least one response template data structures, the metadata including one or more channels of communication relating to the at least one response template data structure, at least one keyword from the response of the at least one response template data structure, and a template group indicator; and
associating an intent tag with each of the at least one response template data structures, the intent tag being determined by an AI intent engine analyzing a communication between a contact center agent and a customer for which the contact center agent used the potential response of the at least one response template data structures as a response to the communication; and
storing each of the at least one response template data structures with corresponding metadata and intent tags in a database of a knowledge management system that is used to provide contact center agents with responses to communications from customers.

7. The computing system of claim 6, the method further comprising:
analyzing the content of a communication between a contact center agent and a customer;
conducting a search of the database with the AI engine to identify at least one response template data structure that corresponds to the communication; and presenting the potential response of the at least one response template data structure that corresponds to the communication as a response to the communication.

8. The computing system of claim 6, wherein the step of associating an intent tag is repeated for multiple communications between contact center agents and customers.

9. The computing system of claim 6, wherein the database includes data records from additional resources.

10. The computing system of claim 9, wherein the additional resources are at least one of a CRM system, an accounting system, and an interaction records system.

* * * * *